United States Patent [19]
Sato et al.

[11] Patent Number: 6,142,677
[45] Date of Patent: Nov. 7, 2000

[54] PLASTIC SPLIT OPTICAL ALIGNMENT SLEEVE FOR OPTICAL CONNECTORS AND METHOD OF FABRICATING THE SAME

[75] Inventors: Hirotsugu Sato, Mito; Yoshito Shuto, Hitachi; Shunichi Tohno, Mito, all of Japan

[73] Assignee: Nippon Telegraph and Telephone Corporation, Tokyo, Japan

[21] Appl. No.: 08/824,870

[22] Filed: Mar. 26, 1997

[30] Foreign Application Priority Data

Mar. 29, 1996 [JP] Japan .................................. 8-077541
Mar. 29, 1996 [JP] Japan .................................. 8-077556

[51] Int. Cl.$^7$ ........................................................ G02B 6/38
[52] U.S. Cl. .............................................................. 385/72
[58] Field of Search ................................ 385/72, 78, 95, 385/96, 99, 50, 55, 129, 142, 144; 428/35.2, 138, 346, 913; 156/150, 153, 242, 245, 292, 86; 174/DIG. 8; 219/528, 544

[56] References Cited

U.S. PATENT DOCUMENTS

| | | | |
|---|---|---|---|
| 4,509,820 | 4/1985 | Mursta et al. ............................ | 385/99 |
| 4,892,379 | 1/1990 | Takeda et al. . | |
| 4,925,266 | 5/1990 | Huescher et al. ........................ | 385/78 |
| 5,000,537 | 3/1991 | Saito et al. . | |
| 5,239,603 | 8/1993 | Sonoda et al. . | |
| 5,380,386 | 1/1995 | Oldham et al. .......................... | 385/50 |
| 5,452,386 | 9/1995 | van Woesik . | |
| 5,731,051 | 3/1998 | Fahey et al. ............................. | 385/95 |

FOREIGN PATENT DOCUMENTS

| | | |
|---|---|---|
| 0 169 073 A2 | 1/1986 | European Pat. Off. . |
| 0 543 094 A1 | 5/1993 | European Pat. Off. . |
| 07318759 | 12/1995 | Japan . |
| 08005866 | 1/1996 | Japan . |

OTHER PUBLICATIONS

Sato et al, "Fundamental Discussion of Precision Molding Technology for Optical Parts", USPP International and Annual Conference 96, pp. 243–244, Jun. 1996.

"Plastic Splices and Connector for Optical Fibers–By Precision Molding Techniques", Tetsuo Yoshizawa, et. al., Kenkyu Jitsuyoka Kokoku (E.C.L. Tech. Jour.), NTT, Japan, vol. 32, No. 3, pp. 831–842, 1983.

"Failure Probability of a Split Ceramic Alignment Sleeve in Optical Fiber Connector", Kazunori Kanayama, et. al., The Transactions of the IECICE; vol. E. 72, No. 4, Apr. 1989, pp. 68–70.

Sato et al., "Fundamental Discussion of Precision Molding Technology for Optical Parts", USPP International and Annual Conference 96, Jun. 4–6, 1996, pp. 243–244.

Hibino et al., "Slitted Sleeve of Plastics", 1988 Autumn National Convention Record, The Institute of Electronics, Information and Communication Engineers, Sep. 6–9, 1988, p. B–1.

*Primary Examiner*—Akm E. Ullah
*Attorney, Agent, or Firm*—Venable; Robert J. Frank; Jeffrey W. Gluck

[57] ABSTRACT

A plastic split optical alignment sleeve comprising a cylindrical plastic sleeve with a slit in a side surface thereof to be arranged in an adaptor which splices optical fiber chords having inserted therethrough optical fibers and having a ferrule on each end thereof, the sleeve being capable of engaging therein the ferrules on both sides thereof to splice the optical fibers, comprises a resin composition which when injection molded exhibits an anisotropy of 1.5 or less, the anisotropy being expressed in terms of ratio of a physical property, preferably flexural modulus, in a first direction in which a resin in the resin composition flew upon injection molding and that in a second direction which is at right angles to the first direction. The resin composition contains at least one resin selected from polyetherimides, polyethersulfones, and epoxy resins and at least one inorganic substance selected from whiskers and silica powder.

13 Claims, 16 Drawing Sheets

PLASTIC SPLIT OPTICAL ALIGNMENT SLEEVE FOR OPTICAL CONNECTORS AND METHOD OF FABRICATING THE SAME

BACKGROUND OF THE INVENTION

1. Field of the Invention

The present invention relates to a plastic split optical alignment sleeve for optical connect which directly holds and connects optical fiber chords having incorporated therein optical fibers, and to a method for fabricating such a plastic split optical alignment sleeve.

2. Description of Related Art

Development in optical communication technology has introduced an optical fiber system into almost every home, and variegated communication services are becoming possible. For realizing an optical communication network for subscribers, economical optical connectors are required.

As shown in FIGS. 1 and 2, a conventional apparatus for splicing optical fiber chords 5,5 used for optical communication uses a connector including connecting plugs P,P incorporating respective ferrules 2,2, in each of which an optical fiber is inserted, and a split alignment sleeve A, which has engaged therein the connecting plugs P,P at both ends thereof for aligning the ferrules 2,2, the split alignment sleeve being inserted in a connecting adaptor B. Here, many of the ferrules have an outer diameter of 2.5 mm.

FIG. 3 shows a conventional split alignment sleeve A for optical connectors. The sleeve A, made of a metal, like phosphor bronze, or a ceramic such zirconia, has a slit 1 along its length. The sleeve A has an inner diameter slightly smaller than its outer diameter and holds and aligns the ferrules 2,2 due to its spring property or elasticity (FIG. 4).

The connecting adaptor B, as shown in FIGS. 1 and 2, comprises a set of sleeves 3,3, a set of housings 4,4 for supporting the sleeves 3,3, and a screw (not shown) connecting the housings 4,4 at their flange portions. At respective edges of the sleeves 3,3 project engaging portions 3a, 3a which engage respective engaging grooves 8a,8a of frames 8,8 of the connecting plugs P,P.

On the other hand, each of the set of connecting plugs P,P, as shown in FIGS. 1 and 2, comprises a ferrule 2 having incorporated therein a capillary (not shown) through which an optical fiber chord 5 is inserted and held therein; a coil spring 6 arranged behind the ferrule 2 and pushing the ferrule 2 forward; a cylindrical stop ring 7 having an inner step portion which contacts the inside of a rear end of the coil spring 6; a plug frame 8 which engages with the stop ring 7 to restrict the motion of the ferrule 2; a thumb nut 9 fitted around the plug frame 8; a caulking ring (not shown) which fixes by caulking Kevlar in the optical fiber chord 5 to the rear end of the stop ring 7; and a rubber holder 10 engaged in the caulking ring.

To splice the optical fibers in the optical fiber chords 5,5 with the set of the connecting plugs P,P and connecting adaptor B thus-constituted, it is only necessary to insert the tips of the connecting plugs P,P into the both ends of the connecting adaptor B so that the engaging projections 3a,3a can engage with the engaging grooves 8a,8a of the plug frames 8,8.

When this is done, the connecting plugs P,P are connected to the connecting adaptor B such that projecting outer surfaces of the ferrules 2,2 contact the inner surface of the split alignment sleeve A and the projecting inner surfaces of the sleeves 3,3 contact the projecting outer surfaces of the plug frames 8,8 and that the end faces of the optical fibers inserted in the both connecting plugs P,P are pushed toward each other to connect to each other due to a force exerted by the coil springs 6,6 incorporated in the connecting plugs P,P.

As a result, the optical fibers of the optical fiber chords 5,5 are connected to each other at low optical losses.

Hitherto, in splicing optical fibers, end faces of optical fibers have been designed so that they are under a pushing force of 10 N, while the holding force of the split sleeve A for holding the ferrules 2,2 is set to 3 to 6 N. However, if the grabbing force (i.e., tightening force) of the split sleeve A is too weak, the ferrules 2 tend to come out with ease, and bending or slipping tends to occur when vibration is applied. On the contrary, if the grabbing force is too strong, fluctuation in compression fixation of the ferrules 2,2 decreases to obviate the above-described defects while in contrast thereto, the pushing force of 10 N at the respective connecting plugs P,P is lessened too much, causing adverse effects on the connection stability of the connecting plugs. For these reasons, recently, it has been considered desirable that the split sleeve A have a grabbing force of no less than 10 N and a holding force of 1.5 to 4.5 N for grabbing or holding the ferurles 2,2. As described above, split sleeves are important among various components of an optical connector.

As described in the foregoing, conventional split sleeves have been made from phosphor bronze or ceramics and manufacture thereof requires a number of man-hours in, for example a step of grinding the inner surface of the sleeve to perfect roundness, so that the cost of a split alignment sleeve increases, thus preventing economization on or cost reduction of connectors themselves.

On the other hand, there have been approaches to fabricting split alignment sleeves by plastic molding. For example, Yoshizawa et al. fabricated cylindrical pipes from phenol resin by transfer molding and made a slit in them by post-processing to obtain plastic split optical alignment sleeves (Kenkyu Jitsuyoka Hokoku (Investigation Realization Report), Vol. 32, No. 3, pp. 831–842 (1983)). However, the above-described process is not so advantageous from the viewpoint of a manufacturing process, since transfer molding requires post-treatments after molding, such as removal of flashes and the like, and formation of slits by post-treatment is also undesirable from an economic viewpoint. Some recent examples are known in which plastic split optical alignment sleeves are produced by injection molding, which is economically advantageous, of polyphenylene sulfide (PPS) and liquid crystal polymers, which are thermoplastic resins, without post-treatment.

However, these conventional plastic split optical alignment sleeves have been used for so-called multi-mode fibers having an optical fiber whose pore has a large outer diameter, e.g., about 50 μm. the conventional plastic split sleeves are applicable to such multi-mode optical fibers but are inapplicable to so-called single-mode optical fibers currently used in communication and having a core whose outer diameter is 8 to 10 μm.

More specifically, it has been considered impossible to realize plastic split optical alignment sleeves which meet various requirements, such as dimensional accuracy, smoothness of inner surface, mechanical strength, various reliabilities and so on, that are acceptable for splicing single-mode optical fibers. Connection characteristics of an optical connector can be evaluated in terms of connection loss and return loss on the end face of an optical fiber. Under ordinary physical contact (PC) conditions, a connection loss of no higher than 0.5 dB and a return loss of no lower than 25 dB are required. Under advanced physical contact (Ad- PC) conditions, a return loss of 40 dB or higher is required. Furthermore, from a practical viewpoint, it is required that the connection characteristics should not be decreased under various severe conditions. Such environmental stability has not been sufficiently considered with regard to conventional plastic split optical alignment sleeves.

SUMMARY OF THE INVENTION

Therefore, an object of the present invention is to provide a plastic split optical alignment sleeve suitable for splicing single-mode optical fibers.

Another object of the present invention is to provide a method for fabricating a plastic split optical alignment sleeve suitable for splicing ru single-mode optical fibers.

1) In order to achieve the above-described objects, according to a first aspect of the present invention, there is provided a plastic split optical alignment sleeve comprising a cylindrical plastic sleeve with a slit in a side surface thereof to be arranged in an adaptor which splices optical fiber chords each having inserted therethrough an optical fiber and each having a ferrule on an end thereof, the sleeve being capable of engaging therein the ferrules on both sides thereof to splice the optical fibers, wherein the split alignment sleeve comprises a resin composition which when injection molded exhibits an anisotropy of 1.5 or less, the anisotropy being expressed in terms of ratio of a physical property in a first direction in which a resin in the resin composition flew upon injection molding and that in a second direction which is at a right angle to the first direction.

2) Here, the physical property may preferably be flexural modulus.

3) The resin composition in the plastic split ru Adoptical alignment sleeve of 1) above may comprise at least one resin selected from the group consisting of polyetherimides, polyethersulfones, and epoxy resins and at least one inorganic substance selected from the group consisting of whiskers and silica powder.

4) The resin in the resin composition in the plastic split optical alignment sleeve of 3) above may preferably comprise at least one resin selected from the group consisting of polyetherimides and polyethersulfones and the inorganic substance is at least one of the whiskers.

5) The resin composition in the plastic split optical alignment sleeve of 4) above may have a flexural modulus of $5 \times 10^9$ Pa or more.

6) The resin composition in the plastic split optical alignment sleeve of 4) above may contain the whisker preferably in an amount of 20 to 60% by weight.

7) The resin composition in the plastic split optical alignment sleeve of 3) above may comprise an epoxy resin and silica powder.

8) The resin composition in the plastic split optical alignment sleeve of 7) above may have a flexural modulus of $10^{10}$ Pa or more.

9) The resin composition in the plastic split optical alignment sleeve of 7) above may contain the silica powder in an amount of 50 to 90% by weight.

10) According to a second aspect of the present invention, there is provided a method of fabricating a plastic split optical alignment sleeve comprising a cylindrical plastic sleeve with a slit in a side surface thereof to be arranged in an adaptor which splices optical fiber chords each having inserted therethrough an optical fiber and each having a ferrule on an end thereof, the sleeve being capable of engaging therein the ferrules on both sides thereof to splice the optical fibers, the method comprising the steps of: providing a resin composition which when injection molded exhibits an anisotropy of 1.5 or less, the anisotropy being expressed in terms of ratio of a physical property in a first direction in which a resin in the resin composition flew upon injection molding and that in a second direction which is at a right angle to the first direction; and injecting the resin composition using a mold comprising a cavity part which defines an outer diameter of a molded article, a splitting part which defines a splitting portion, and a core pin which defines an inner diameter of the molded article, the splitting part and the core pin constituting an integrated part.

11) Here, the physical property may preferably be flexural modulus.

12) The resin composition used in the method of fabricating a plastic split optical alignment sleeve of 10) above may comprise at least one resin selected from the group consisting of polyetherimides, polyethersulfones, and epoxy resins and at least one inorganic substance selected from the group consisting of whiskers and silica powder.

13) The resin composition used in the method of fabricating a plastic split optical alignment sleeve of 12) above may comprise at least one resin selected from the group consisting of polyetherimides and polyethersulfones and the inorganic substance is at least one of the whiskers.

14) The resin composition used in the method of fabricating a plastic split optical alignment sleeve of 12) above may comprise an epoxy resin and silica powder.

According to the present invention, plastic split optical alignment sleeves are obtained which can be used for splicing single- and multi-mode optical fibers, and which are excellent in connection characteristics, reliabilities, and economical advantage.

The above and other objects, effects, features and advantages of the present invention will become more apparent from the following description of the embodiment thereof taken in conjunction with the accompanying drawings.

DETAILED DESCRIPTION OF THE INVENTION

Figure 1:
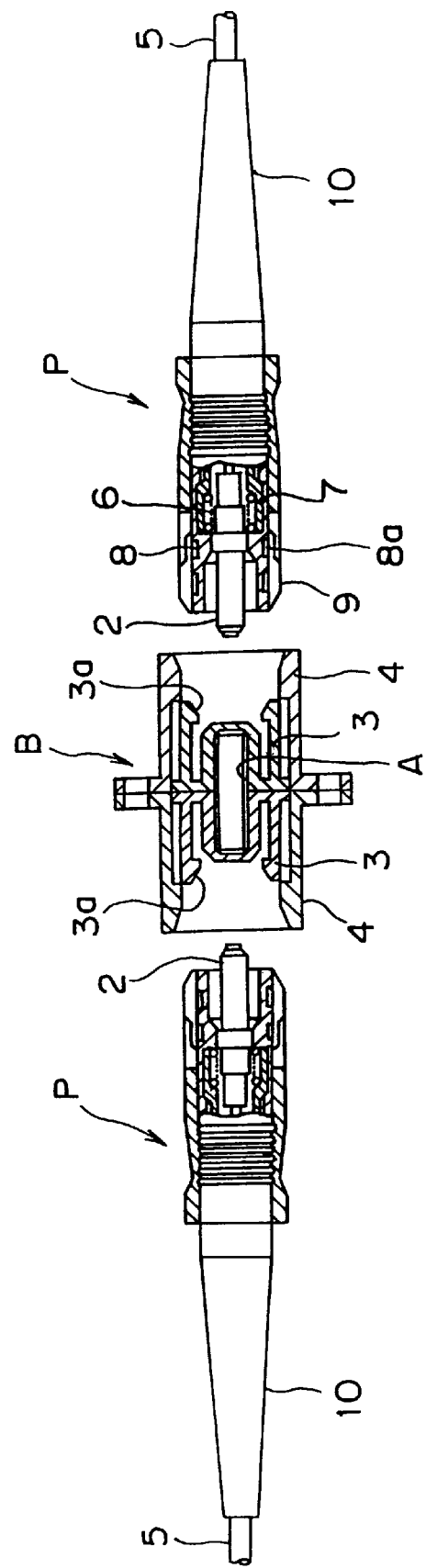
FIG. 1 is a cross sectional view showing an optical connector before splicing optical fibers.
Figure 2:
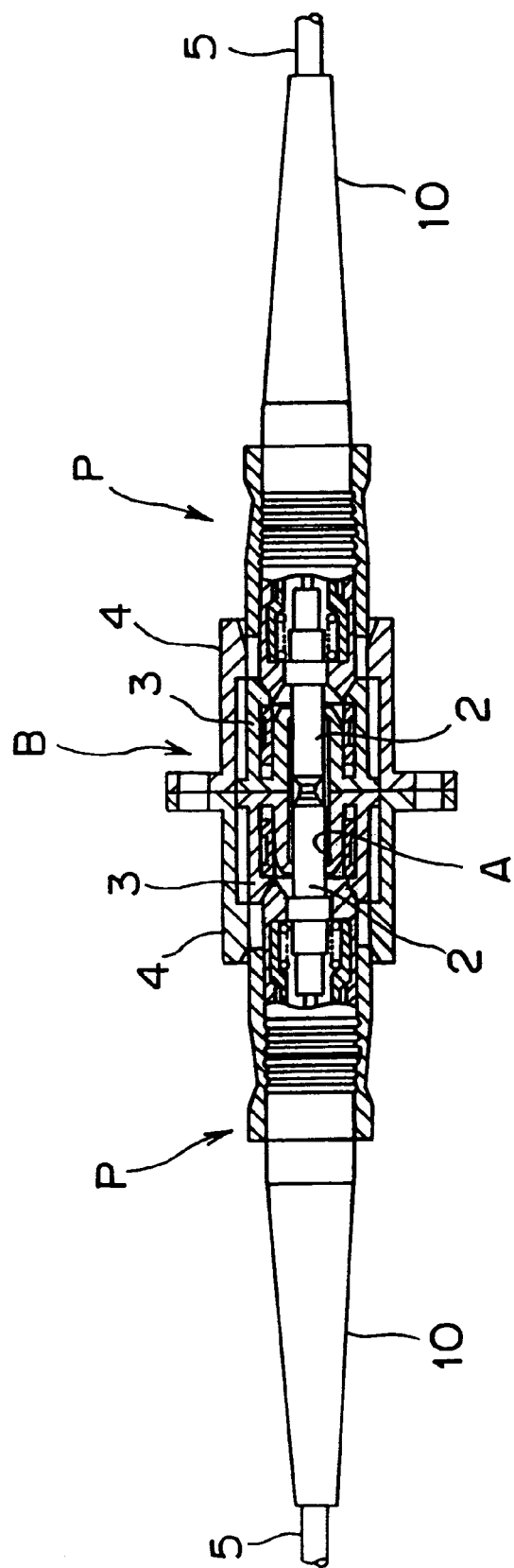
FIG. 2 is a cross sectional view showing an optical connector after splicing optical fibers.
Figure 3:
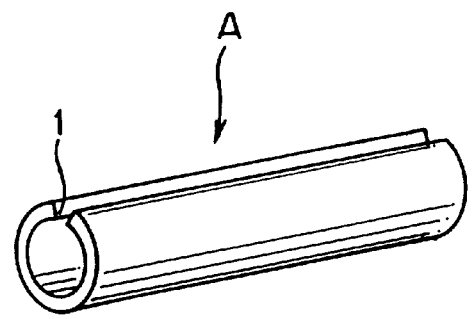
FIG. 3 is a perspective view showing a split sleeve.
Figure 4:
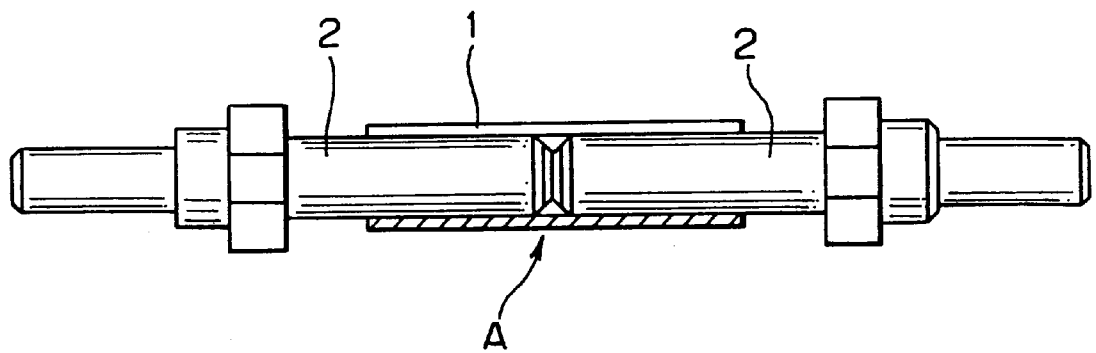
FIG. 4 is a partial cross sectional side view showing a split sleeve in which ferrules are engaged.

First, conditions (1) to (4) required on the quality of the plastic split optical alignment sleeve of the present invention will be described.

(1) Precision Molding

In order to realize low loss connection and obtain a certain acceptable grabbing force, molding has to be conducted with dimensional accuracy with respect to inner diameter, thickness, roundness error of outer diameter, and the like, of the split optical alignment sleeve. Molded articles require dimensional accuracy in molding within an allowance of 5 $\mu$m.

More specifically, the following parameters (a) to (d) are important.

(a) Difference Between the Outer Diameter and Inner Diameter at Both Ends of Split Alignment Sleeve The principle of connection tells us that there will be a difference in grabbing force when there is a large difference in inner diameter between both ends, resulting in unstable connection characteristics. Therefore, an acceptable dimensional allowance must be within 5 $\mu$m.

(b) Roundness and Cylindricality of Split Alignment Sleeve

For realizing a stable connection, the split alignment sleeve is desirably is of a complete cylindrical shape. That is, it is desired that the molded article be of a complete circle in each cross section. However, generally, plastic molded articles tend to deform due to residual stress, so that the cross sectional profile will deviate from a true circle. Also, it is empirically known that pipe-shaped molded articles generally have a cross sectional profile of being somewhat enlarged or inflated at both end portions, as compared to a central portion, along its length to give a configuration something like an elongated noodle (or hyperboloid of revolution of one sheet). Particularly, pipe-shaped molded articles with slits, such as split alignment sleeves, tend to undergo deformation to a large extent.

However, in split optical alignment sleeves, their central portions are of practical importance. Assuming the length of a molded article is 11.4 mm, the cylindricality of a portion of the article extending ±3 mm from the centesis important, and that portion has to have a cylindricality of within 5 $\mu$m.

(c) Eccentricity of Split Alignment Sleeve

In the split alignment sleeve, two ferrules, more particularly the respective cores of two optical fibers fixled to the centers of ferrules, must be butted within an accuracy of ±1 $\mu$m. For this purpose, the distance of the central point of each cross section of a split alignment sleeve from the origin of an absolute spatial coordinate, in other words, concentricity, must be within ±1 $\mu$m. However, it is generally difficult to accurately measure the concentricity of an element having a special configuration such as a split alignment sleeve. Measurement of roundness error by using a feeler involves a problem that there can occur deformation due to contact pressure by the feeler. Therefore, it is a practically desirable approach to set up reference standards for concentricity by measuring eccentricities of outer and inner diameters of a split alignment sleeve at both ends, and such reference standards must be each within 5 $\mu$m.

(d) Smoothness of Inner Surface

If the inner surface of a split alignment sleeve has insufficient smoothness, coupling between ferrules upon connection becomes unstable. As a standard for smoothness, there can be used Ra values measured by using a surface roughness meter. It is preferred that the values so measured be within 0.5 $\mu$m, more preferably within 0.1 $\mu$m.

(2) Required Grabbing Force and Holding Force

As described above, the split alignment sleeve must have a grabbing force of at least 10 N and a holding force of 1.5 to 4.5 N. Since optical connectors are required to be mounted in an increasingly high density, split alignment sleeves must have a smaller thickness. Accordingly, a thinner material having an excellent mechanical strength is needed. In the case where plastic materials are used, the thickness of split alignment sleeve must be increased because plastic materials have a flexural modulus smaller (by about 1 digit) than that of metals or ceramics. The thickness, inner diameter and grabbing force of a split alignment sleeve can be obtained by calculation from the flexural modulus of the material used according to kinetics. Even in the case of plastic materials, necessary grabbing and holding forces can be obtained within a practical range of 0.4 to 1.0 mm in thickness if they have a flexural modulus of $5 \times 10^9$ Pa.

(3) High Slidability

Ferrules and split alignment sleeves must endure repeated push-pull operations. That is, they must not produce dust or undergo dimensional changes upon push-pull operations, since this would greatly influence connection loss. Holding force depends on a product of a grabbing force with a coefficient of friction between the sleeve and ferrule, and, hence, a suitable coefficient of friction, for example, 0.3 or less is needed.

(4) Reliability

Split alignment sleeves fix ferrules fundamentally based on the principle of a spring. Therefore, a decrease in the spring force given by the split alignment sleeve over a long period of time due to relaxation of stress of plastics constituting the sleeve will lead to failure to maintain the required grabbing force, resulting in a variation in connection loss. Also, dimensional changes of plastics due to changes in temperature and humidity will cause similar problems to occur.

Next, conditions (A) to (D) required for molding plastic split alignment sleeves will be described below.

(A) Selection of Resin

Plastic materials which can be used instead of metal and ceramics materials are usually called engineering plastics, and various types of such engineering plastics have been developed. Among them, so-called "general-purpose engineering plastics" include polybutylene terephthalate (PBT), polycarbonate (PC), polyamide (PA), polyphenylene oxide (PPO), polyacetal (PA) and the like. On the other hand, so-called "high performance engineering plastics" include polyarylate (PAR), polysulfone (PSF), polyphenylene sulfide (PPS), liquid crystal polymer (LCP), polyethersulfone (PES), polyetherimide (PEI), polyamideimide (PAI), polyether ether ketone (PEEK), polyimide (PI) and the like.

Here, resins are roughly classified into two groups, i.e., thermoplastic and thermosetting resins. The above-described resins belong to thermoplastic resins, which are solid at room temperature but melt to become liquid when heated at temperatures no lower than their melting points. Then, the liquid can be introduced in a mold and solidified therein to fabricate a molded article. On the contrary, thermosetting resins when heated do not polymerize but are in a complete liquid state. The liquid can be introduced into a mold, and after heating for a certain period of time, the resin crosslinks to form a resin molded article. Such thermosetting resins include, for example, phenol resins, unsaturated polyester resins, epoxy resins, diaryl phthalate resins, silicone resins and the like.

<Advantages of Thermoplastic Resins>

(a) High Productivity

Generally, molded articles are final products without post-treatments, and hence, continuous automatic production is possible so that economic molding can be achieved. Thermoplastic resins generally have low viscosities, so flashes will occur unavoidably and deflashing process is required after molding. It is also necessary to complete curing of resins by post-heating. Therefore, thermosetting resins are less advantageous than thermoplastic resins from the viewpoint of economy in molding.

(b) Controllability of Resin Flows

The viscosity of a resin varies depending on temperature and shearing stress. Various analyses of variation of these characteristics can be made by numerical simulation, and results obtained can be used for designing molds or articles. Therefore, thermoplastic resins can cope with fabrication of various articles having complicated shapes.

(c) Variety in Types of Resin

As described above, many thermoplastic resins have been developed, and suitable resins can be selected from a wide variety of resins depending on the design and price of articles.

<Advantages of Thermosetting Resins>

(a') Completely Isotropic Characteristics of Resins

Thermosetting resins are introduced into a mold in a state of "monomer", which has a low molecular weight, and cured as they are. Hence, a molded article therefrom has no anisotropy and its mechanical characteristics, mold shrinkage factor and the like are isotropic. From this it follows that no stress nor deformation due to orientation of the resin after molding tends to occur, even for molded articles having complicated shapes. On the other hand, thermoplastic resins generally have some orientation and have different physical properties in the direction along the flow of resin from in the direction at a right angle thereto. Among the thermoplastic resins, crystalline resins differ from non-crystalline resins in anisotropy; non-crystalline resins have lower anisotropy than that of crystalline resins. However, completely isotropic physical properties have not been realized yet.

(b') Small Residual Stress in Molded Articles

Molding of thermoplastic resins proceeds such that a molten resin is cooled to solidify in a mold. Thus, if there exists a portion in the heat diffusion process which proceeds in the mold, the resin is cooled at non-uniform rates from portion to portion so that there will appear microfine unevenness in the density of resin, generating inner stress or residual stress. This results in a decrease in dimensional accuracy. On the other hand, thermosetting resins are heated "uniformly" in a heat-curing process for a certain period of time (e.g., 1 to 3 minutes) so that unevenness in density or residual stress of the resin due to thermal unevenness can be reduced to lower levels.

(B) Selection of Additives

Generally known additves which can be used in resin compositions include glass fibers, carbon fibers, glass beads and the like as well as graphite, Teflon beads, and various inorganic additives, such as zinc oxide and potassium titanate.

As a result of investigation on various types of such engineering plastics and additives, it has now been found that in order to obtain a resin composition which meets mechanical strength, creep resistance, dimensional stability against temperature and humidity, and precision moldability, required by the present invention, it is important to use a resin composition which contains a resin having a low anisotropy. The anisotropy of a resin can be expressed in terms of a ratio of a target physical property in the direction along which the resin flew and that in the direction at right angle thereto, the ratio being calculated by dividing the greater one of the two physical propertiy values by the smaller one, and resins having an anisotropy of no more than 1.5 are suitable. Here, regarding the shape of article on which the anisotropy is to be evaluated, usually ASTM test samples used for the evaluation of the physical properties of resins and plates (e.g., 60×60×3 mm) can be used. The resin sample is provided with a gate at its end, and, test pieces having a suitable shape in the direction in which the resin flew and in the direction at right angle thereto, respectively, are cut out, and physical properties of each test piece are measured. A simple calculation gives the anisotropy of the resin concerned. Larger anisotropies indicate that the resin is more oriented in the direction in which the resin flew. In the case of thermoplastic resins, usually the flexural modulus in the direction in which the resin flew is larger than that in the direction at a right angle thereto. In the present invention, use of resin compositions having an anisotropy of no more than 1.5 gives rise to excellent effects. In the case of thermosetting resins, the ratio must be 1 since in this type of resin anisotropy can be neglected. However, there are some errors to the extent of about ±0.1 in cutting out test pieces and in measurement, and hence, the anisotropy ranges from 0.9 to 1.1 in actuality. The anisotropy of resins can be evaluated in ways other than measuring flexural modulus. For example, mold shrinkage factor or coefficient of linear expansion may be measured, and the results can be used for calculating ratios in the same manner as described above for evaluation. However, mold shrinkage factor is less accurate in measurement than flexural modulus, while coefficient of linear expansion is more difficult to measure than flexural modulus. Therefore, in the present invention, it is preferred to use flexural modulus for evaluation of the anisotropy of the resin or resin composition.

More specifically, a resin composition which comprises at least one resin selected from polyetherimides, polyethersulfones, and epoxy resins and at least one inorganic substance selected from whiskers (monocrystalline inorganic needles) and silica powder exhibits excellent effects. The resins or inorganic substances may be used alone or in admixture.

Here, polyetherimides and polyethersulfones, which are non-crystalline engineering plastics, can be used advantageously in the present invention since they are oriented to a lesser extent and have good mechanical strength and heat resistance. Crystalline resins such as PPS and LCP are highly anisotropic, and hence, deformation after molding and relaxation of stress over a long period of time cannot be neglected.

Examples of the polyetherimide include those polymers having a repeating unit structure represented by formulae (Ia) to (Id) below, in which n is an integer of 10 to 500. Among them, the polymer of formula (Ia) is commercially available (GE Plastics, trade name: ULTEM). The polymers having repeating unit structures represented by formulae (Ib) to (Id) are known or can be prepared by a conventional manner. However, the polyetherimides which can be used in the present invention are not limited thereto.

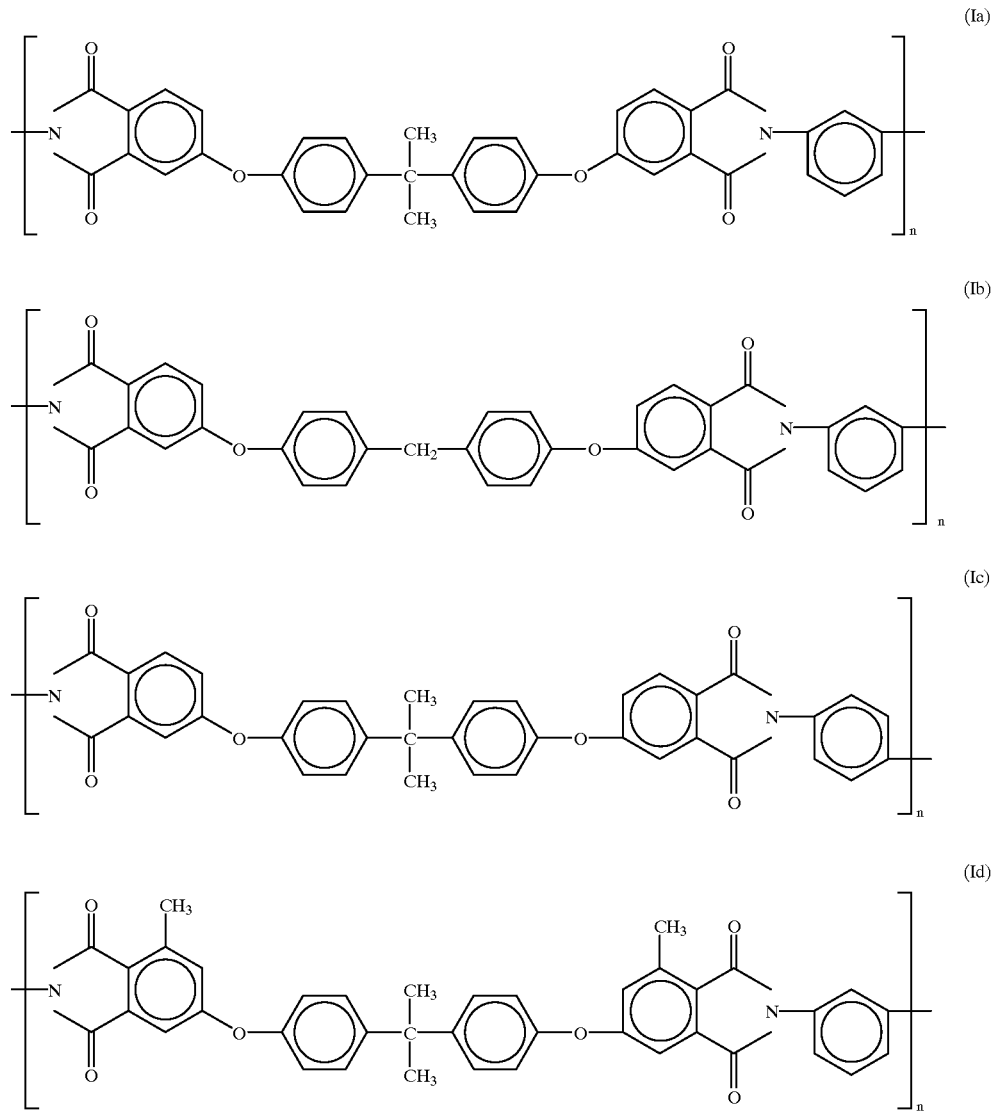

Examples of the polyethersulfones include those polymers having repeating unit structures represented by formulae (IIa) to (IIe) below, in which n is an integer of 10 to 500. Among them, the resin of formula (IIa) is commercially available (Sumitomo Chemical Co., Ltd., trade name: SUMIKA EXCEL). The polymers having repeating unit structures of formulae (IIb) to (IIe) are known or can be prepared by a conventional manner. However, the polyethersulfones which can be used in the present invention are not limited thereto.

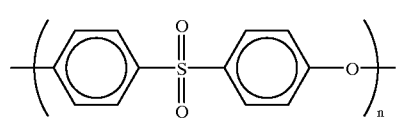
(IIa)

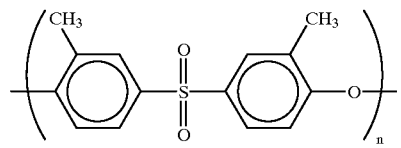
(IIb)

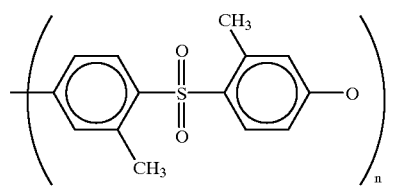
(IIc)

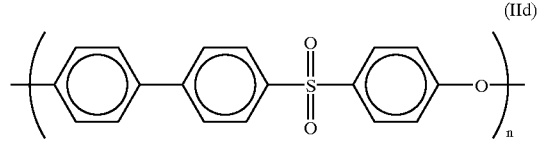
(IId)

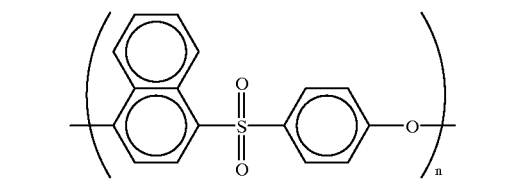
(IIe)

Epoxy resins are completely isotropic and superior to the thermosetting resins in realizing low mold shrinkage factor and suitable mechanical and thermal characteristics. The epoxy resin referred to herein means those polymers formed by reaction of an epoxy resin precursor having an epoxy group with a curing agent. The epoxy resin precursor includes o-cresol novolak type epoxy resins, bisphenol type epoxy resins, naphthalene type epoxy resins and the like. Examples of the epoxy resin precursors include those represented by formulae (IIIa) to (IIIcc) below, in which n is an integer of 1 to 5.

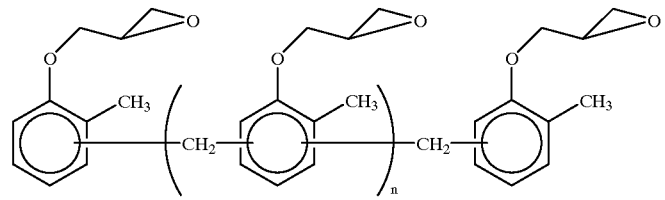
(IIIa)

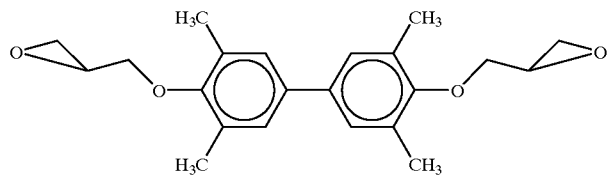
(IIIb)

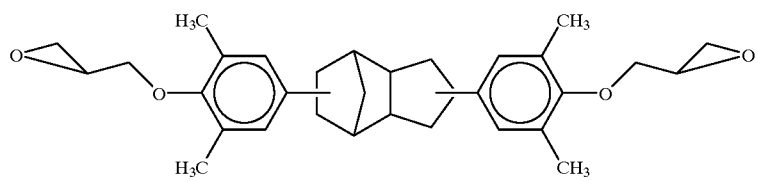
(IIIc)

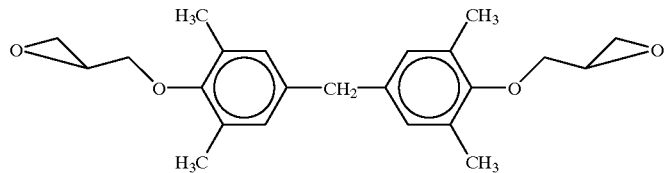
(IIId)

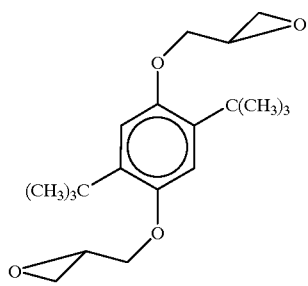
(IIIe)
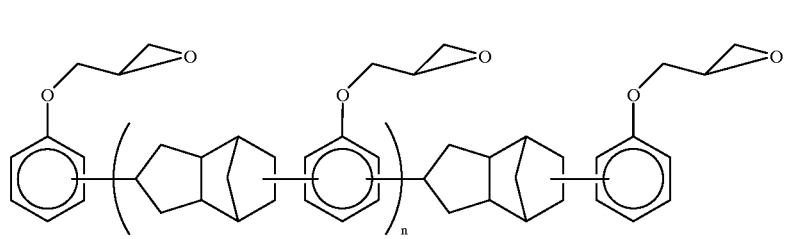
(IIIf)
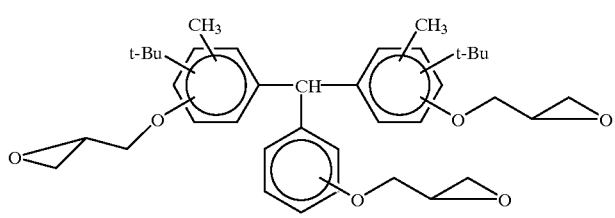
(IIIg)
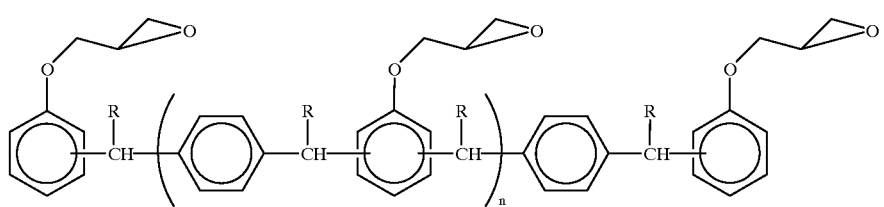
(R = CH₃, C₂H₅ or C₃H₈)
(IIIh)
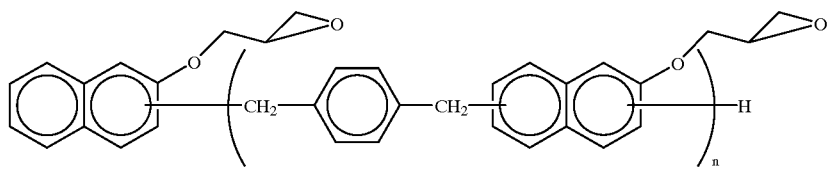
(IIIi)
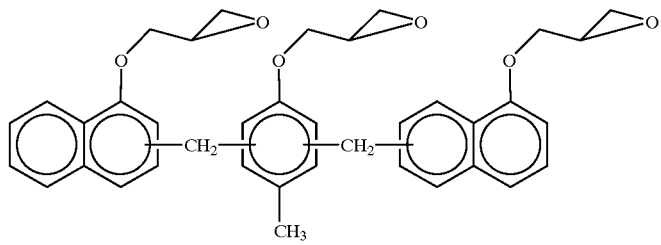
(IIIj)

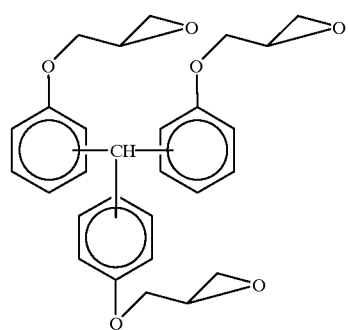
(IIIk)
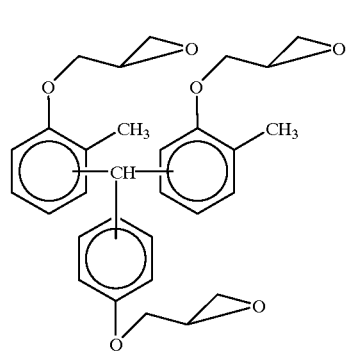
(IIIl)
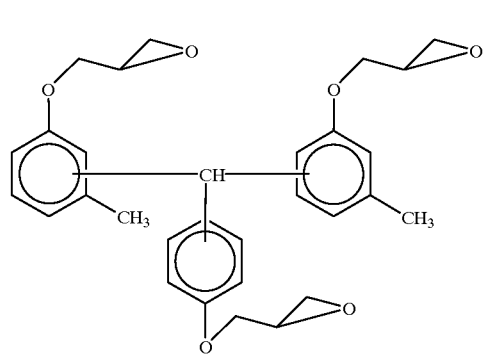
(IIIm)
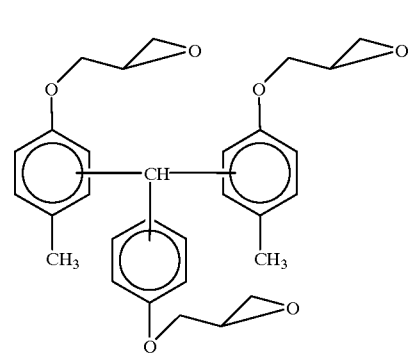
(IIIn)

(IIIo)
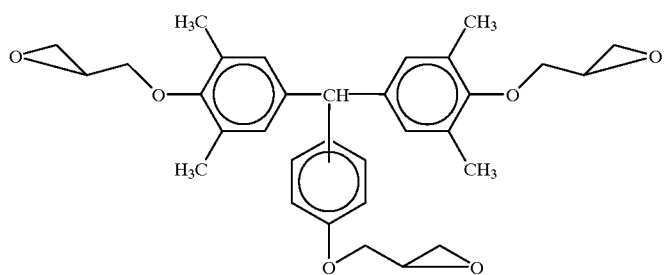
(IIIp)
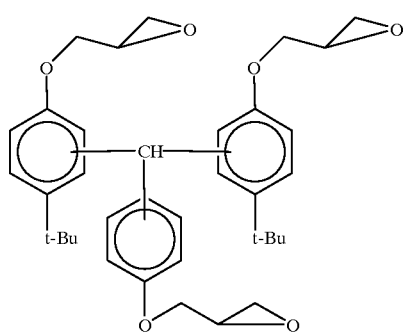
(IIIq)
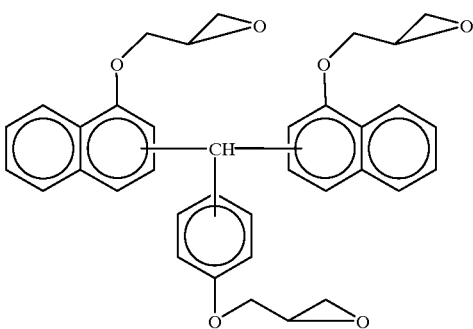
(IIIr)
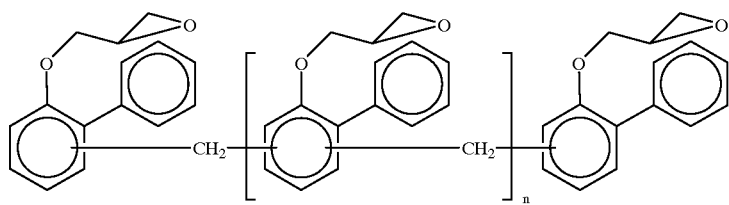
(IIIs)
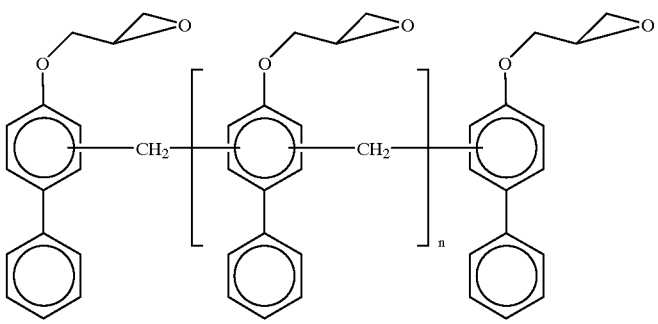

(IIIt)
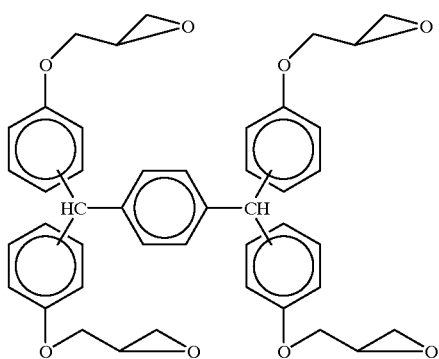
(IIIu)
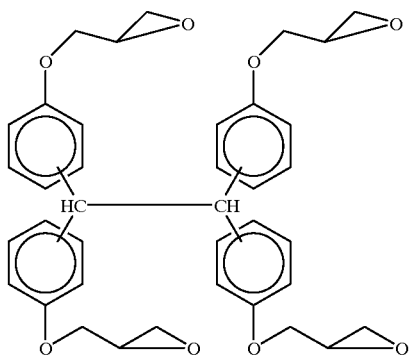
(IIIv)
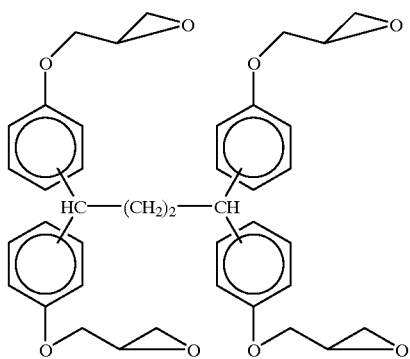
(IIIx)
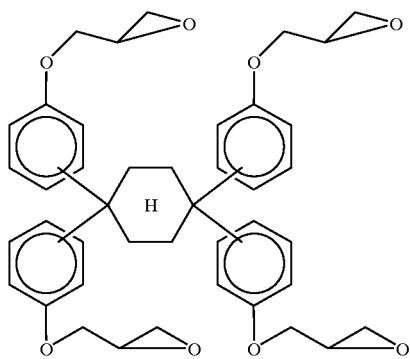

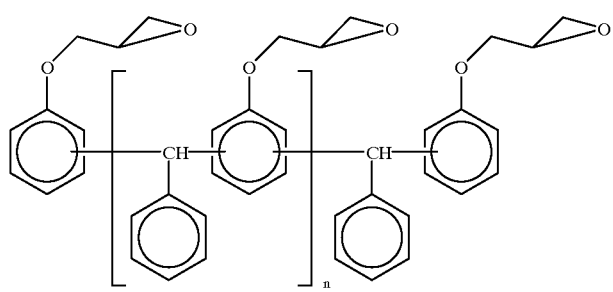
(IIIy)
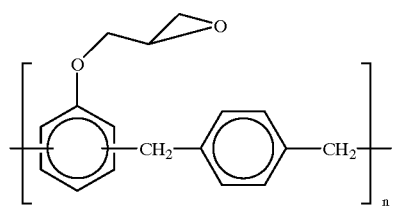
(IIIz)
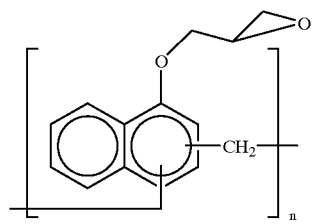
(IIIaa)
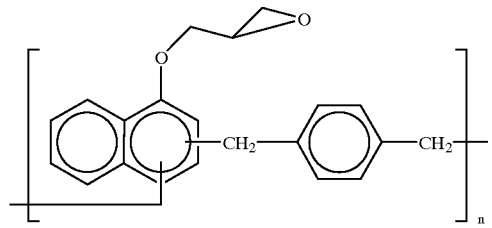
(IIIbb)
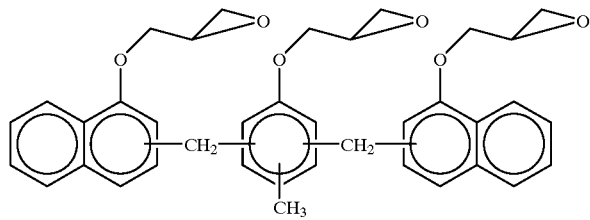
(IIIcc)

As the curing agent, there can be used various types of curing agents such as those represented by formulae (IVa) to (IVf) below, in which n is an integer of 1 to 5. Of these, phenol novolak resins are used generally.

resistance and chemical resistance. Further, whiskers are short fibers ranging from several $\mu m$ to several hundred $\mu m$, with an aspect ratio of 30 to 300. Such whiskers are suitable in the present invention basically because isotropy can be

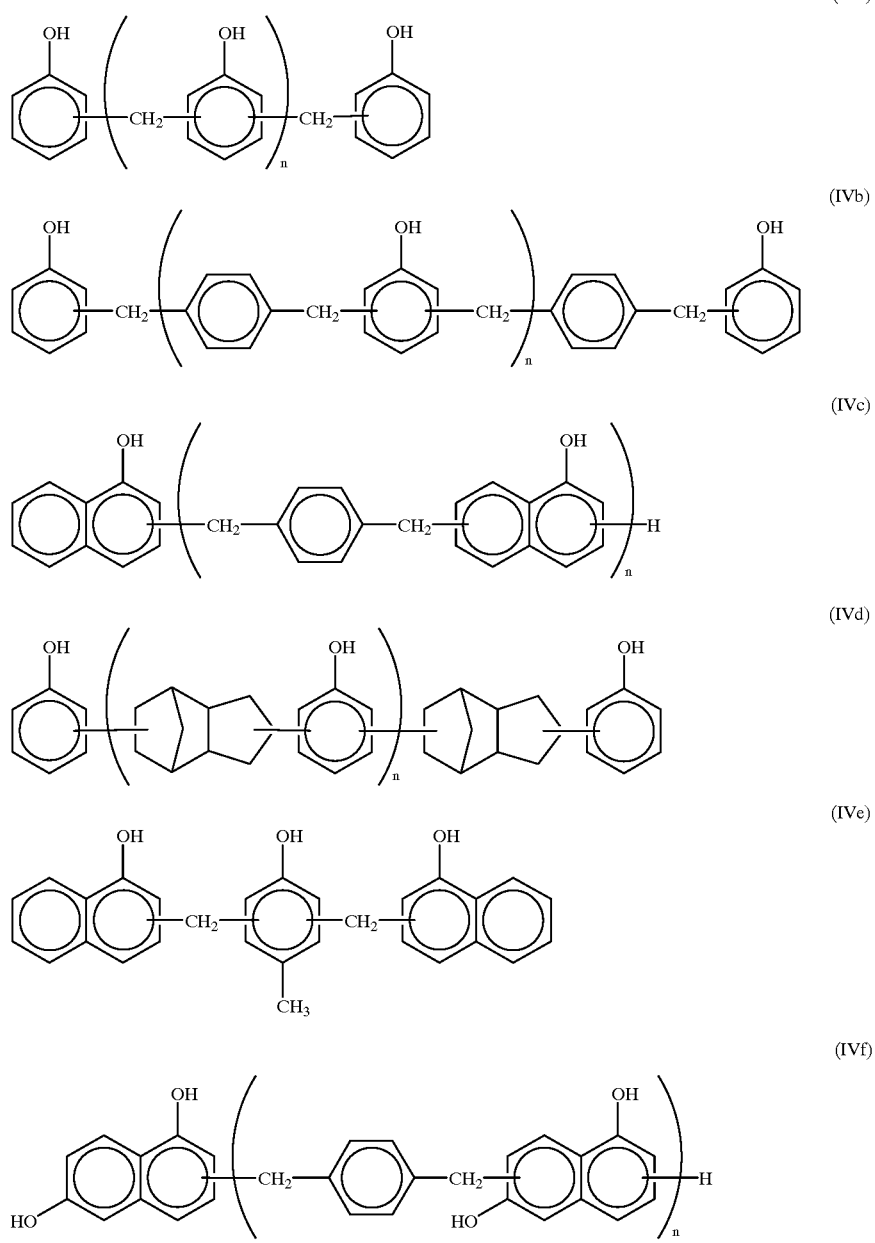

Among various additives, monocrystalline inorganic needles (whiskers) and/or silica powder are advantageous for realizing the effect of the present invention. Monocrystalline inorganic needles are also referred to as whiskers, and those made of ceramics are well known. More specifically, example of inorganic substances include zinc oxide, magnesium oxide, titanium oxide, aluminum oxide, potassium titanate, aluminum borate, silicon carbide, silicon nitride, graphite, calcium carbonate, zinc carbonate, magnesium hydroxide, mica and the like. Since whiskers are monocrystalline needles, they exhibit mechanical strengths close to ideal values and are excellent in heat resistance, abrasion increased therewith. Addition of fibrous materials such as glass fiber and carbon fiber increases the anisotropy of resins, even if molded articles are based on non-crystalline resins, and it is difficult to realize the dimensional accuracy as described above. Also, it is important for split alignment sleeves to have a smooth inner surface. However, addition of fibrous additives could result in failure to provide a smooth inner surface since the fibrous materials come up to the surface, thus making the surface uneven.

Examples of preferred whiskers which can be used in the present invention include potassium titanate, zinc oxide, silicon carbide and mica. Zinc oxide whisker may preferably be of tetrapod-like shape. Such tetrapod-like whisker gives excellent effects. Similar to the whiskers, silica powder can give excellent effects. Silica powder has no anisotroy, has a low coefficient of thermal expansion, and has an excellent mechanical strength.

More specifically, a resin composition comprised of a polyetherimide or polyethersulfone containing a whisker gives an excellent effect. Further, a resin composition comprising a polyetherimide or polyethersulfone containing a whisker and having a flexural modulus of at least $5 \times 10^9$ Pa exhibits excellent effects of the present invention. Below this value, reliability of connection at high temperatures tends to decrease. Further, a resin composition which comprises a polyetherimide and/or polyethersulfone containing a whisker in an amount ranging from 20 to 60% by weight exhibits excellent effects similarly. While an increased amount of the additive improves mechanical properties such as flexural modulus, mold shrinkage factor, and coefficient of linear expansion of the resin composition, it also decreases the amount of the resin so that the fracture strength of the resin composition tends to decrease.

A resin composition which comprises an epoxy resin containing silica powder exhibits excellent effects of the present invention. Further, a resin composition which comprises an epoxy resin containing silica powder, with the resin having a flexural modulus of at least $10^{10}$ Pa, exhibits excellent effects. Since epoxy resins are low in impact strength as compared with thermosetting resins, it is suitable that the flexural modulus be set at higher levels. Below this value, reliability of connection under high temperature and high humidity conditions tends to be decreased. Further, a resin composition which comprises an epoxy resin containing silica powder in an amount of 50 to 90% by weight, preferably 70 to 90% by weight, similarly exhibits excellent effects. Here, an increased content of silica powder leads to an increase in mechanical characteristics such as flexural modulus, mold shrinkage factor and coefficient of linear expansion but also to a decreased fracture strength because of a decreased content of the resin.

In addition to the whiskers and silica powder, the resin composition of the present invention may contain surface treating agents for the additive, coloring agents and the like, if desired.

(C) Requirements for Molding Techniques

The resin composition thus defined can be molded by ordinary injection molding. Other molding techniques such as compression molding and transfer molding are less preferred since they are less desirable in terms of continous moldability and molding accuracy.

(D) Requirements for Molds

Figure 5C:
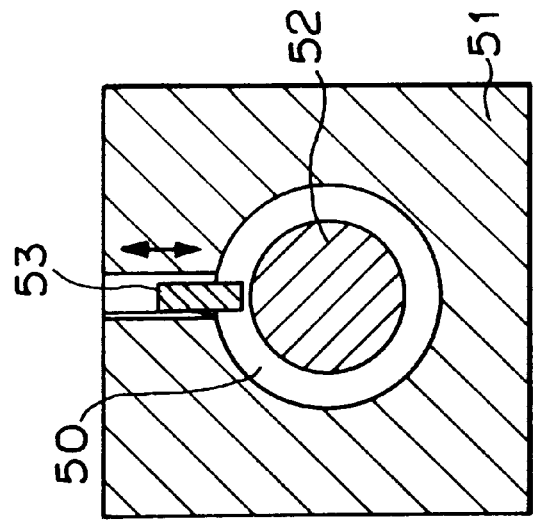
FIG. 5C is a cross sectional view showing a conventional mold having a cavity part in which a core pin and a splitting part are inserted.
Figure 5B:
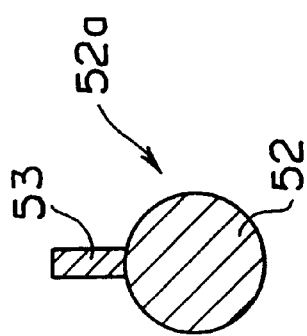
FIG. 5B is a cross sectional view showing a core pin integrated with a splitting part.
Figure 5A:
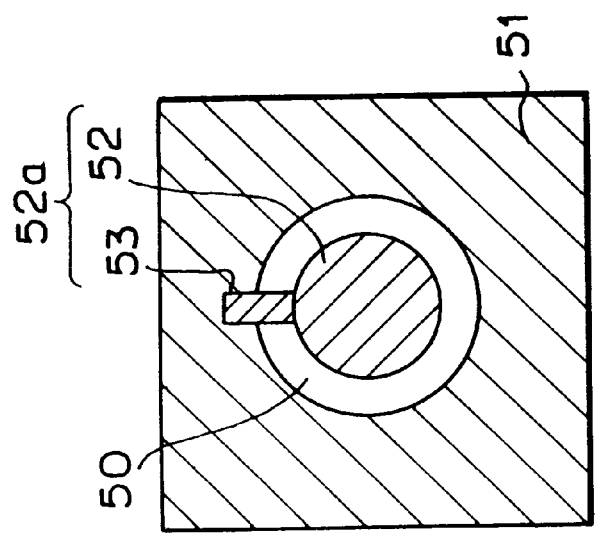
FIG. 5A is a cross sectional view showing a mold having a cavity part in which a core pin integrated with a splitting part is inserted.

In injection molding, the design of molds is important. A mold for forming split alignment sleeves comprises a cylindrical "cavity" which defines the outer diameter of a split sleeve, a "core pin" which defines the inner diameter of the molded sleeve, and a "splitting part" which defines a split portion. FIG. 5A is a cross sectional view showing a mold which can be used in the present invention. As shown in FIG. 5A, the mold includes a cavity part 51 in which a cylindrical cavity 50 is formed and a core pin 52a acocntrically inserted in the cavity 50 of the cavity part 51. The core pin 52a has a cylindrical body or core pin 52 and a splitting part 53 integral to the core pin 52 (FIG. 5B). The present invention feature the use of such an integral core pin complex or core pin-splitting part structure. Conventionally, a splitting part 53 is arranged in a slide groove and moved in a slide-core process so that the splitting part can move up and down in accordance with the opening and closure of the mold, and when it comes down it contacts the core pin 52 (FIG. 5C). This two-part system of conventional molding process has the following problems.

(i) In the slide-core process, the splitting part and the core pin contact each other so that the core pin tends to move or swing to make the eccentricity of the split alignment sleeve 10 μm or more.

(ii) Also, in the slide-core proess, fine adjustment of the clearance between the splitting part and the core pin is needed so that otherwise flashes tend to occur on the inner surface of the resulting split alignment sleeve. This means a fatal defect in optical coupling. In the present invention, flashes of several μm long may possibly occur on the outside surface of split alignment sleeves. However, the outside flashes of sleeves have no adverse effect on optical coupling of optical fibers using such sleeves.

The mold structure of the present invention is free of the above-described problems so that split alignment sleeves of the present invention can be fabricated.

Figure 6:
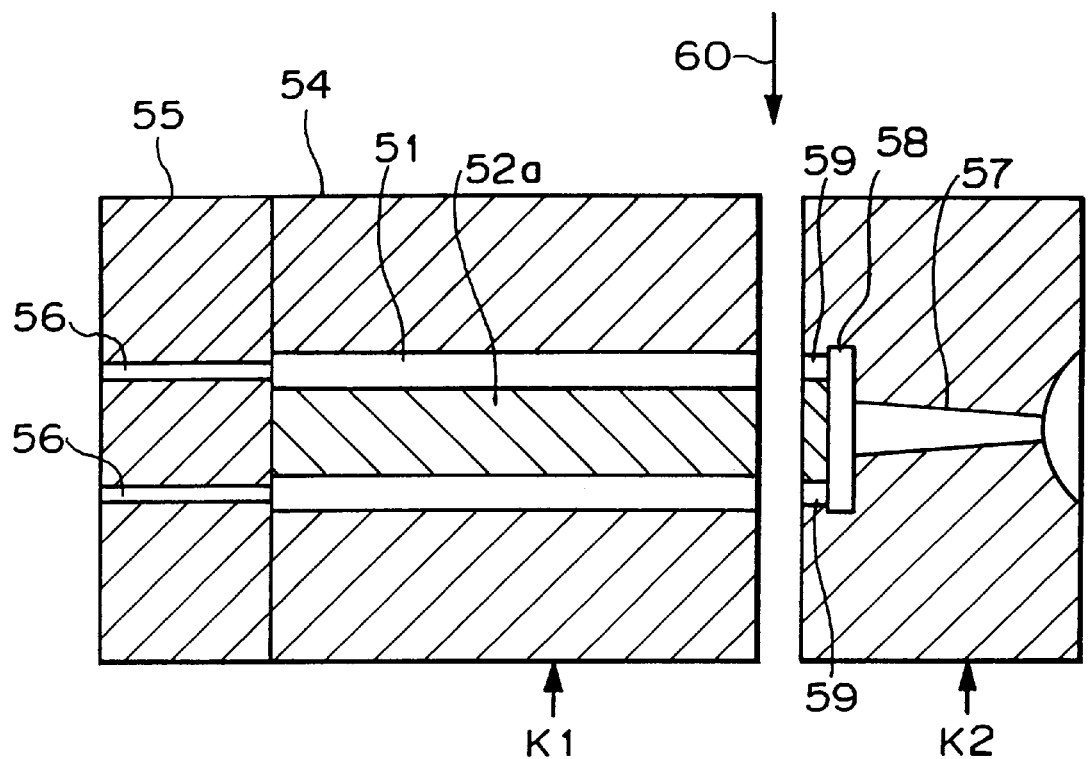
FIG. 6 is a schematic cross sectional view showing a mold.

FIG. 6 shows a fundamental structure of a mold in a horizontal cross section. The mold includes a moving mold part K1, and a stationary mold part K2. The moving mold part K1 has a cavity portion 54 and an ejector portion 55. The cavity portion 54 is provided with the cavity part 51; the integral core pin 52a (core pin 52 and splitting part 53 integral to the core pin 52) (FIGS. 5A and 5B). The ejector portion 55 has an ejector pin 56 for ejecting a molded article. On the other hand, the stationary mold part K2 has a sprue 57, a runner 58 communicating with the sprue 57, and a gate 59 communicating with the runner 58. Arrow 60 indicates a parting plane.

The gate may be of any shape, such as a pin-point gate, a ring gate, and a film gate, and may be selected appropriately depending on the position of the gate. In the present invention, it is suitable that a multi-pin gate is provided on the side of an end face of the article. For example, provision of a single pin-point gate as is ordinarily done is insufficient to achieve perfect roundness required by the split alignment sleeve of the present invention. At least two pins, preferably 3 or 4 pins, are suitable for the gate.

The following factors are also important the mold of the present invention. each size of the mold cavity and pins needs to be such that the value on the gate side and that on the, anti-gate side may differ by at most 1 μm. The cylindricality of mold cavity and pins needs to be with an error of at most 1 μm. Further, it is important that eccentricity of mold cavity and pins at each end of the mold be within 3 μm.

Figure 7A:
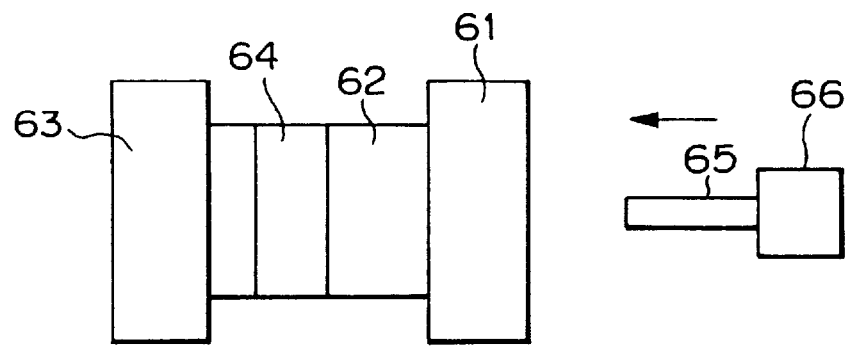
FIG. 7A is a cross sectional view showing a mold in a stage of molding procedure.
Figure 7B:
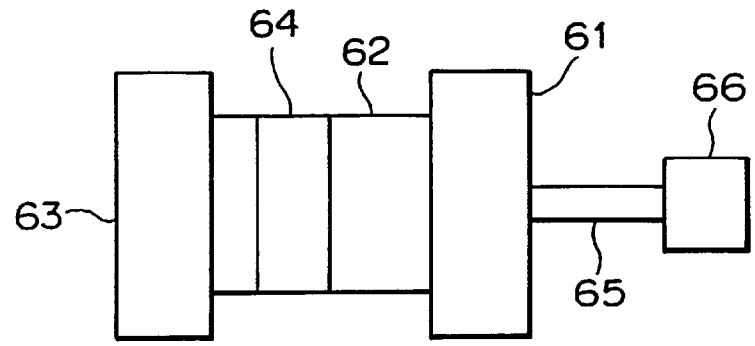
FIG. 7B is a cross sectional view showing a mold in a stage of molding procedure.
Figure 7C:
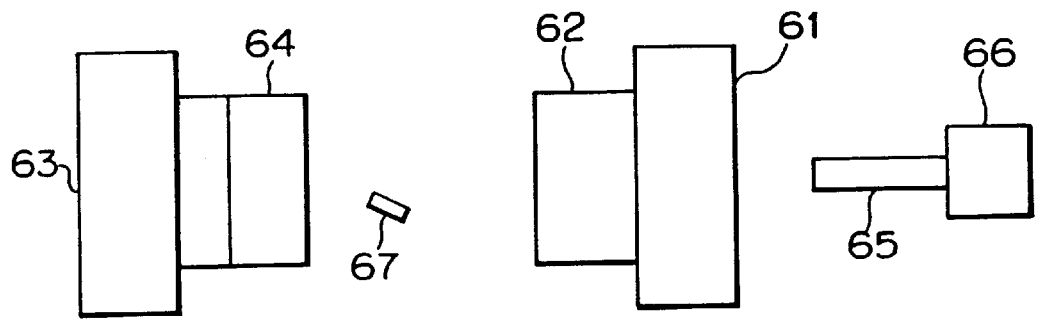
FIG. 7C is a cross sectional view showing a mold in a stage of molding procedure.

As shown in FIGS. 7A to 7C, molding is conducted in the sequence of (a) mold closing, (b) injection, dwelling and cooling (retention with heating when epoxy resin based compositions are used), and (c) mold break and ejection. In FIGS. 7A to 7C, reference numeral 61 designates a stationary platen, 62 is a stationary mold part, 63 is a moving platen, 64 is a moving mold part, 65 is a nozzle, 66 is a cylinder, 67 is a molded article or a split alignment sleeve.

In the step of (a) mold closing, both mold parts 62 and 64 are made solid depending on the action of the moving platen 63. In the step of (b) injection, dwelling and cooling, the resin injected from the nozzle of a molding machine is charged into the cavity through the sprue, runner and gate (injection), and immediately thereafter, high pressure is applied in order to ensure close contact of the molded article to the mold surface (dwelling), and then the resin is left to stand until the resin reaches the temperature of the mold surface (cooling). In the step of (c) mold break and ejection, the mold after cooling is broken and the molded article is ejected by the action of an ejector pin. These operations are repeated automatically to effect continuous molding so that split alignment sleeves can be fabricated economically. When such molds are used, care must be taken for surface accuracy of the surface of the mold and positioning accuracy on the parting plane.

If desired, there may be used various techniques such as: "injection compression," in which after the introduction of a resin, a part of the resin may be compressed using an ejector pin or the like to prevent mold shrinkage; "high rate injection molding," in which the rate of injection is made high, that is, the pressure of injection decreases, "low rate injection molding" in which the rate of injection is made as low as possible to decrease strain after molding, and the like.

In the present invention, a small injection molding machine having a relatively low clamping force (e.g., not higher than 50 tons) can be used. Usually, there can be used a conventional hydraulic injection molding machine, fully electric injection molding machine driven by a servo motor, or a hybrid type molding machine using hydraulic and electromotive systems on the injection and closing sides, respectively. When using molding machines, care must be taken for parallelism between the moving platen to which the mold is attached and the stationary platen. If this value is low, the accuracy of positioning of the mold decreases so that the molding machine is unsuitable for precision molding. The value of parallelism is determined by an error of distance between the platens, which is preferably at most 50 $\mu$m, and more preferably at most 30 $\mu$m. When thermoplastic resins are used, a commonly used, injection molding machine may be used while an injection molding machine for thermosetting resins is used when use is made of epoxy resin compositions. The major difference is that in the case of injection molding machines for thermosetting resins, the temperatures of nozzle and cylinder are set at low levels and overheating should be avoided. This is because thermosetting resins will be cured in the cylinder so that molding will become impossible if the resins are heated more than is necessary. Epoxy resins can usually be molded by transfer molding. Therefore, in the present invention, those epoxy resins that can be molded by injection molding are used. After molding, deflashing and post-curing are conducted as described above. For deflashing, there can be used sand blasting (i.e., blowing fine sand) or the water stream method (i.e., blowing high pressure water) generally employed in the art.

DESCRIPTION OF PREFERRED EMBODIMENTS

Hereinafter, the present invention will be described in greater detail by embodiments with reference to the attached drawings. However, the present invention should not be construed as being limited thereto.

EMBODIMENT 1

A resin composition having the following formulation was prepared.

| | |
|---|---|
| Polyetherimide | 60 parts by weight |
| Potassium titanate | 40 parts by weight |

The resin composition had a flexural modulus of $1.1 \times 10^{10}$ Pa. The anisotropy of the resin was measured using a test piece of a size of 60×60×3 mm in the direction in which the resin flew and in the direction at a right angle thereto. The anisotropy, i.e., ratio of flexural modulus in the direction in which the resin flew and that in the direction at a right angle thereto, was 1.3. Thus, it was confirmed that the resin composition had a considerably low anisotropy. A split optical alignment sleeve was fabricated from the resin composition thus obtained by injection molding using a mold having the dimensional tolerances shown in Table 1 below under the conditions of injection shown in Table 2 below.

TABLE 1

Shape of Mold

| | |
|---|---|
| Outer diameter of core pin | 2.460 mm |
| Inner diameter of cavity | 3.660 mm |
| Width of slit | 0.5 mm |
| Length | 11.4 mm |
| Gate | 4-pin gate |
| Difference in outer diameter of core pin between gate side and anti-gate side | 0.2 $\mu$m |
| Difference in inner diameter of cavity between gate side and anti-gate side | 0.3 $\mu$m |
| Cylindricality of cavity | 0.6 $\mu$m |
| Cylindricality of core pin | 0.3 $\mu$m |
| Eccentricity of core pin and cavity on the gate side | 1.9 $\mu$m |
| Eccentricity of core pin and cavity on the anti-gate side | 2.8 $\mu$m |

TABLE 2

Conditions of Injection

| Item | Condition |
|---|---|
| Drying of resin | 140° C., 5 hours |
| Cylinder temperature | |
| Rear portion | 300° C. |
| Medium portion | 340° C. |
| Nozzle portion | 360° C. |
| Mold temperature | 160° C. |
| Injection pressure | $1.5 \times 10^8$ Pa |
| Screw back-pressure | $8 \times 10^6$ Pa |
| Dwelling pressure | $8 \times 10^7$ Pa |
| Injection rate | 50 cc/second |
| Screw revolution number | 120 rpm |
| Cycle time | 40 seconds |

Table 3 below shows the dimensions of the molded article obtained, which indicates that the molded article showed good dimensional accuracy.

TABLE 3

Shape of Molded Article

| Item | Measured Value | Standard Deviation | Evaluation Method |
|---|---|---|---|
| Inner diameter | G: 2.457 mm | 2.5 $\mu$m | A |
| | AG: 2.461 mm | 3.5 $\mu$m | |
| Outer diameter | G: 3.639 mm | 3.6 $\mu$m | A |
| | AG: 3.643 mm | 4.1 $\mu$m | |
| Eccentricity | G: 3.1 $\mu$m | 1.2 $\mu$m | A |
| | AG: 4.3 $\mu$m | 2.1 $\mu$m | |
| Roundness error of inner diameter | G: 3.3 $\mu$m | 0.8 $\mu$m | A |
| | AG: 3.7 $\mu$m | 1.5 $\mu$m | |

TABLE 3-continued

Shape of Molded Article

| Item | Measured Value | Standard Deviation | Evaluation Method |
|---|---|---|---|
| Roundness error of outer diameter | G: 4.4 µm<br>AG: 4.8 µm | 2.1 µm<br>2.9 µm | A |
| Smoothness of inner surface (Ra) | 0.45 µm | — | B |

Figure 8A:
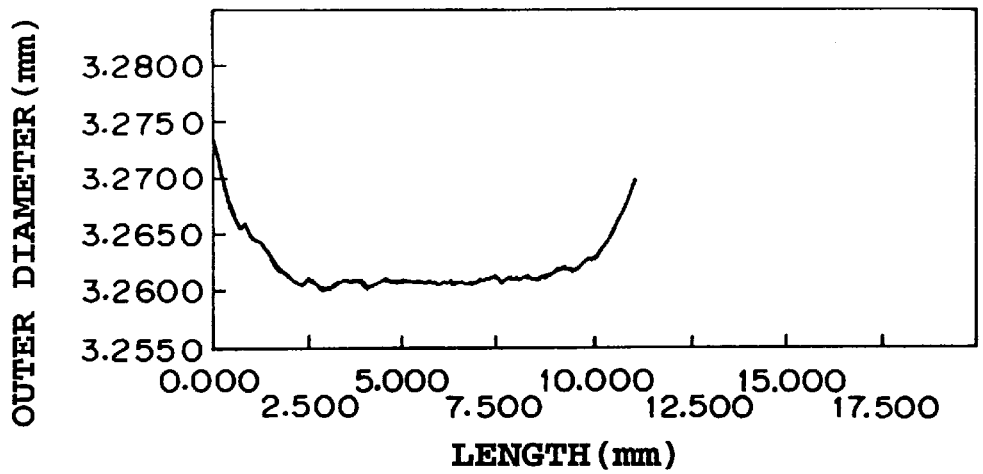
FIG. 8A is a graph illustrating a variation along length of outer diameter of a molded article according to one example of the present invention.
Figure 8B:
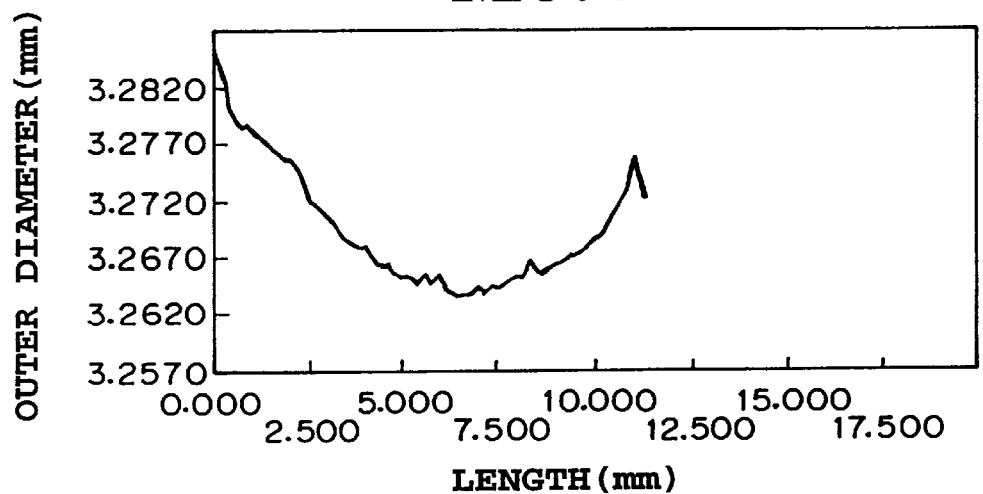
FIG. 8B is a graph illustrating a variation along length of outer diameter of a molded article according to one comparative example.
Figure 8C:
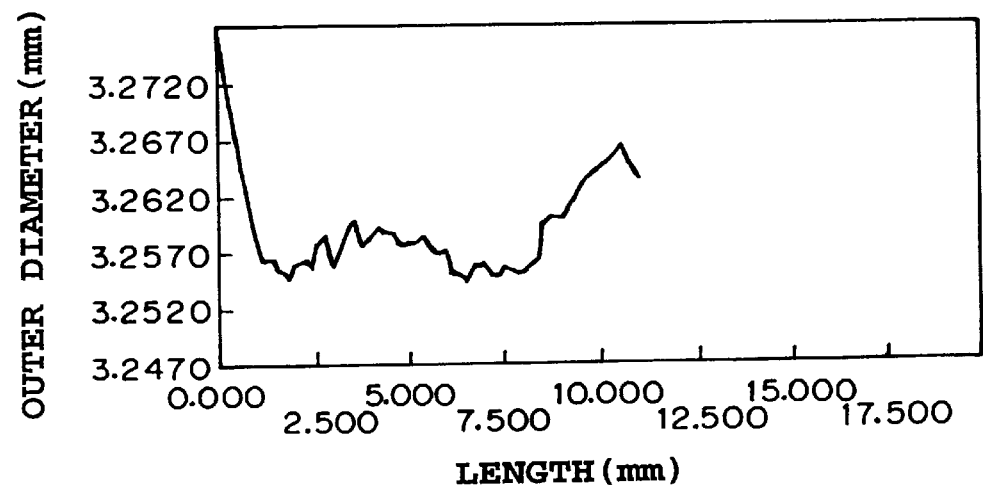
FIG. 8C is a graph illustrating a variation along length of outer diameter of a molded article according to one comparative example.

Notes:
G: gate side;
AG: anti-gate side
Number of test pieces: 20.
"A": Non-contact image processing measurement system
"B": Feeler surface roughness meter FIG. 8A illustrates the results of measurement of the outer diameter of molded article. The values of outer diameter increased to some extent at the gate and anti-gate sides while they are flat in the central part. For comparison, split alignment sleeves were molded from carbon fiber-reinforced polyetherimide resin composition (anisotropy: 1.7, flexural modulus: $1.5 \times 10^{10}$ Pa) and liquid crystal polymer (glass fiber-reinforced one, anisotropy: 3.5, flexural modulus $2.8 \times 10^{10}$ Pa), respectively, and outer diameters thereof were measured on a laser measuring machine. FIGS. 8B and 8C illustrate the results obtained. As will be apparent from the results, the split alignment sleeves of the comparative embodiments showed a considerably wide variation in their dimensions in the longitudinal direction. No flat region was observed. They showed a cylindricality of no smaller than 20 µm. In FIG. 8C, a convex-shaped portion is observed in the curve. From this it follows that with the resin compositions outside the scope of the present invention it was difficult to attain the dimensional accuracy required by split alignment sleeves. Although it would seem desirable that measurement be made of inner diameters of a split alignment sleeve along its length, the outer diameters thereof were measured instead. This is because a 3-dimensional measuring machine has a sensor portion which is of substantially the same order in size as the inner diameter of split alignment sleeve, making it difficult to perform accurate measurements. On the other hand, a roundness error measuring machine in which a small sensor can be used suffers from a problem that the pressure of the feeler is high, so that upon measurement deformation of split alignment sleeves could occur. To avoid these problems, the inner surface profiles of split alignment sleeves were evaluated indirectly by measuring the outer surface profiles thereof. As described later on, the outer diameter reflected well the inner surface profile of a sleeve. Therefore, measurement of outer diameter is useful as a method for evaluating the dimension of split alignment sleeves.

Figure 9:
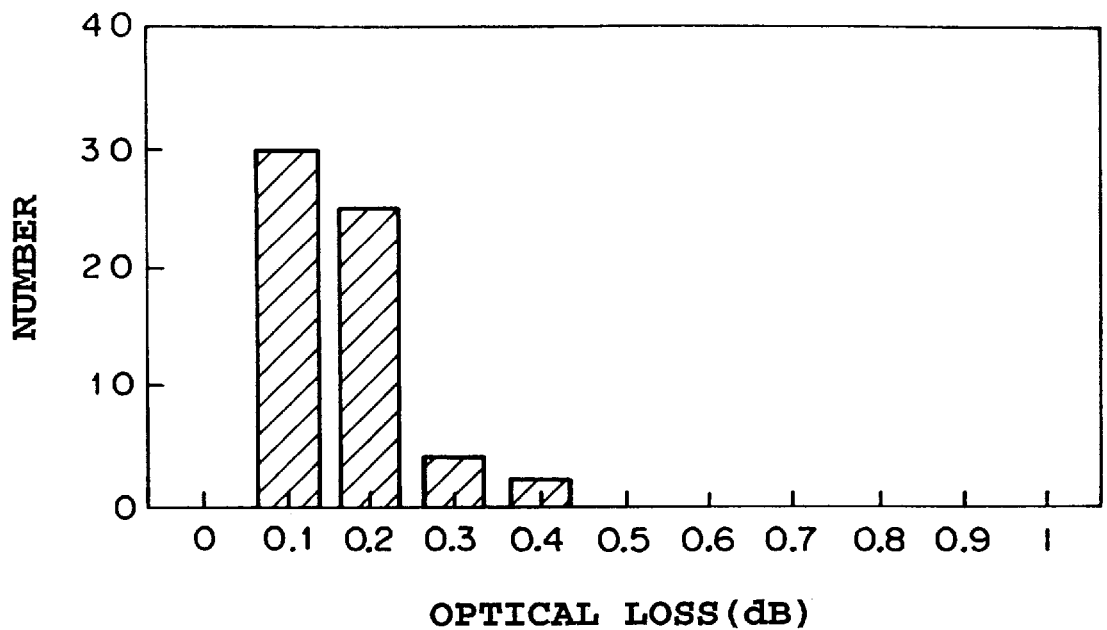
FIG. 9 is a graph illustrating distribution of connection loss of molded articles according to the present invention.
Figure 10:
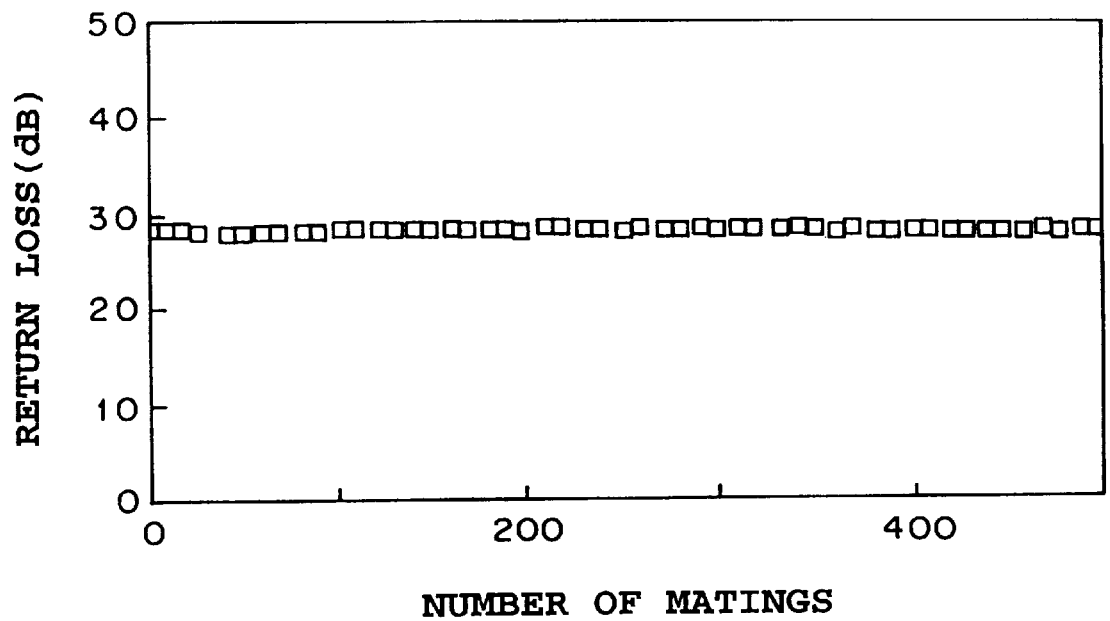
FIG. 10 is a graph illustrating a variation of return loss in push-pull repetition testing for a molded article according to an example of the present invention.

Grabbing force and holding force measured were 20 N and 4 N, respectively, thus meeting the requirement for optical connectors. Here, zirconia ferrule was used for connection tests of single-mode optical fibers. End surfaces of optical fibers were ground under PC conditions. Table 4 shows the results of measurement of coupling characteristics of the molded article, FIG. 9 illustrates distribution of optical loss upon coupling connection of the molded article, and FIG. 10 illustrates a variation in return loss upon mating (attachment/detachment) testing on the molded article.

TABLE 4

| Item | Test Condition | Target Property | Test Results |
|---|---|---|---|
| Optical Characteristics | | | |
| Coupling loss | λ = 1.3 µm | 0.5 dB or less | av. 0.12 dB |
| Return loss | λ = 1.3 µm | 25 dB or more | 28 dB |
| Mechanical characteristics | | | |
| Attachment/detachment test | 500 times | Return loss: 25 dB or more | 28 ± 2 dB |
| Vibration test | 10–55 Hz, 2 hr | Return loss: 25 dB or more | 27 ± 2 dB |
| Impact test | 100G, 6 mm | Return loss: 25 dB or more | 26 ± 2 dB |
| Accelerated deterioration characteristics | | | |
| Temperature cycle | –25 to 70° C., 100 cycles | Return loss: 25 dB or more | 26 dB |
| High temperature | 85° C., 960 hr | Return loss: 25 dB or more | 26 dB |
| Temperature-humidity cycle | –10 to 65° C., 93% RH | Return loss: 25 dB or more | 26 dB |

Figure 11:
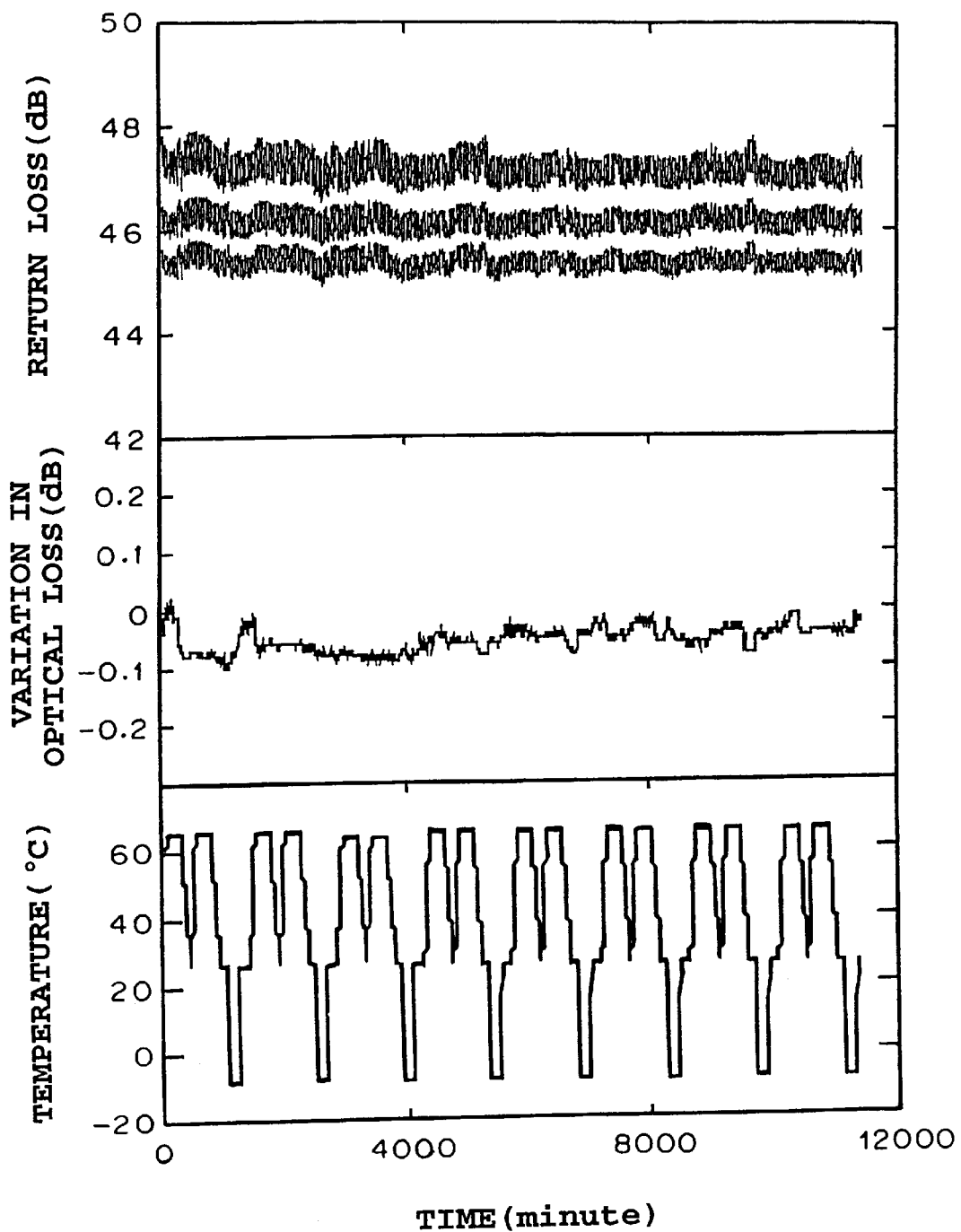
FIG. 11 is a graph illustrating results of temperature cycle tests of a molded article according to one example of the present invention.

From the results described above, the molded article of Embodiment 1 is excellent in coupling characteristics and reliability and has sufficient characteristics for being useful as a plastic split alignment sleeve for coupling single-mode optical fibers. FIG. 11 illustrates the results of temperature cycle tests on return loss and coupling loss. Here, Ad-DC ground zirconia ferrule (return loss: >40 dB) was used. The conditions of temperature and humidity applied were as follows.

Temperature: –10° C. to 25° C. to 65° C.;

Humidity: 93% (at 65° C.);

| | |
|---|---|
| Temperature: | –10° C. to 25° C. to 62° C. |
| Humidity: | 93% (at 65° C.); |
| Cycle duration and times: | 24 hours/cycle, 20 cycles. |

Figure 12:
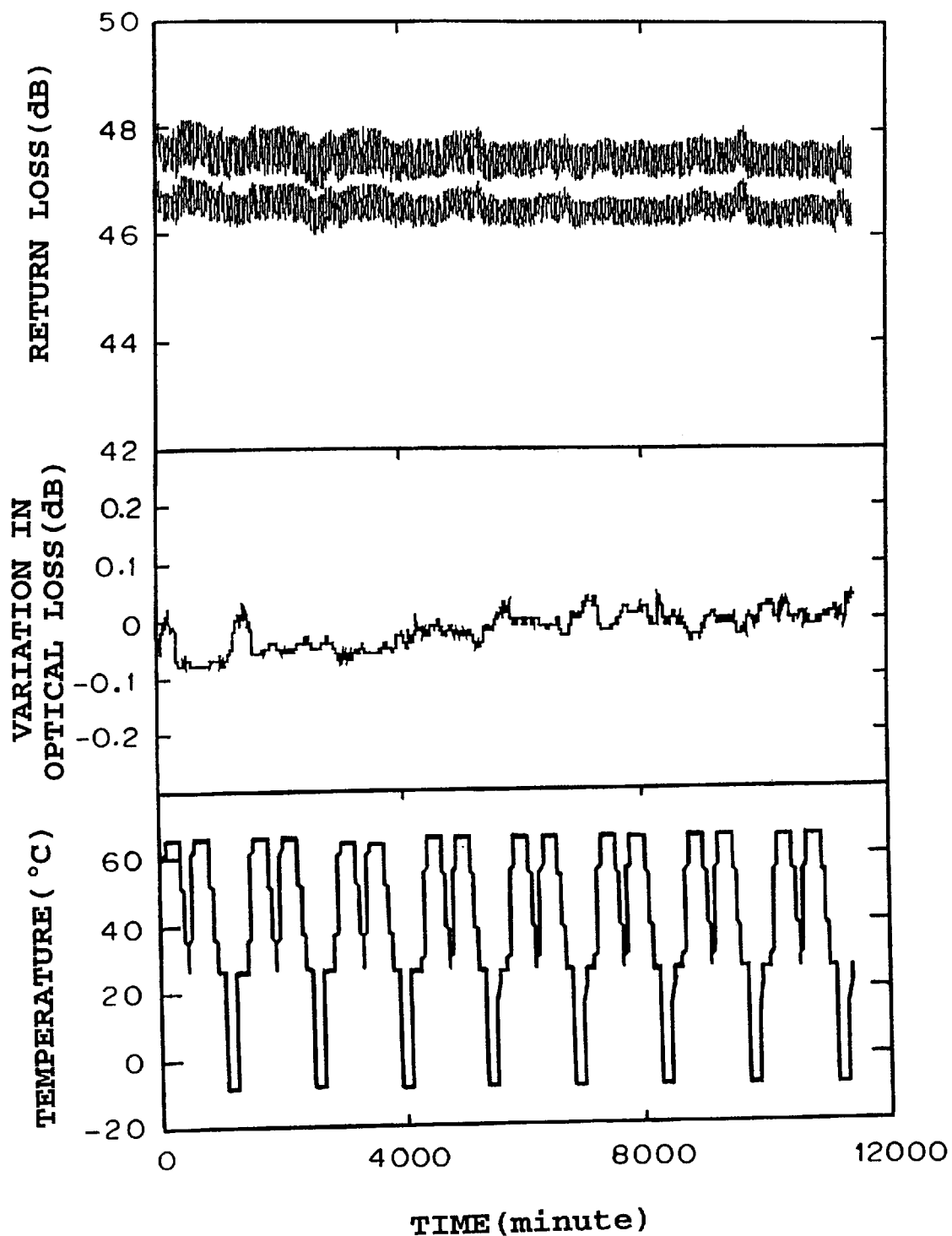
FIG. 12 is a graph illustrating results of temperature cycle tests of a conventional zirconia split alignment sleeve.

FIG. 11 illustrates the results for 8 cycles only. No deterioration in coupling characteristics was observed. After 8 cycles, similar variation was observed. FIG. 12 illustrates the results of the same temperature cycle tests as described above except for using a conventional split alignment sleeve made of zirconia. From the results, it can be seen that the plastic split alignment sleeve of Embodiment 1 exhibited characteristics equal to those of the conventional zirconia split alignment sleeve. Variations of about ±0.1 dB in coupling loss and about ±0.5 dB in attenuation of reflection were considered to be attributable to an influence of variation in the room temperature at which the evaluation system stood.

Figure 13A:
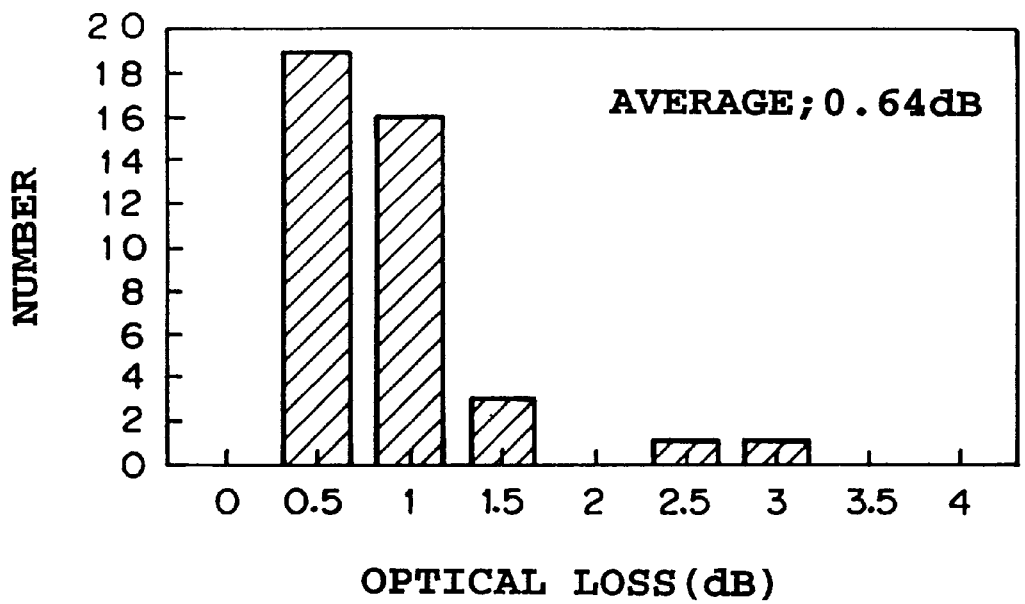
FIG. 13A is a graph illustrating distribution of connection loss of a conventional molded article.
Figure 13B:
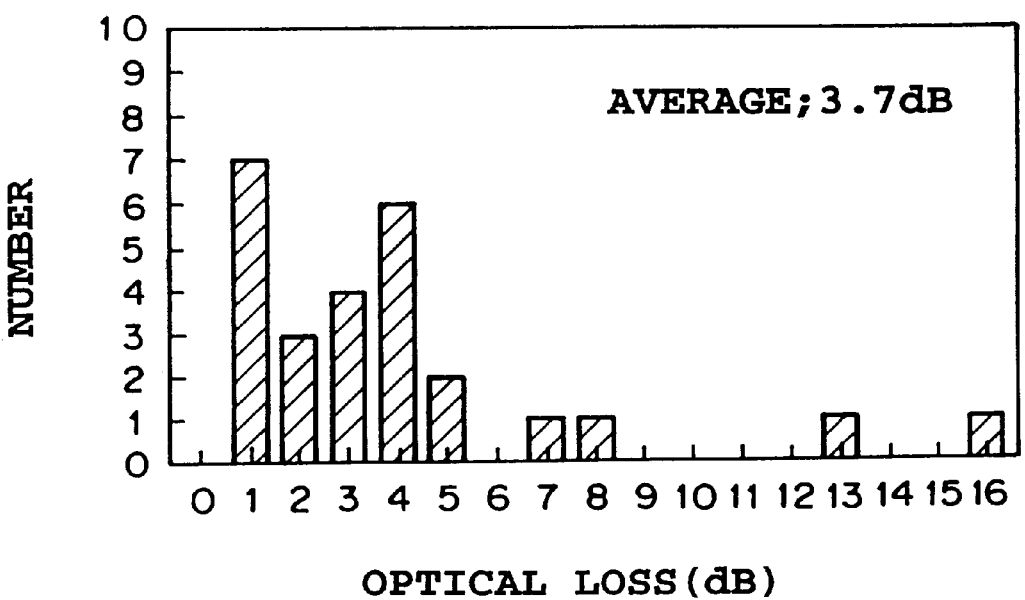
FIG. 13B is a graph illustrating distribution of connection loss of a conventional molded article.

FIGS. 13A and 13B illustrate distribution of coupling loss in the plastic split alignment sleeves of comparative embodiments described above. From the results, it can be seen that coupling characteristics remained unimproved and that the coupling characteristics reflected the difference in dimensional accuracy.

EMBODIMENT 2

A resin composition having the following formulation was prepared.

| | |
|---|---|
| Polyethersulfone | 60 parts by weight |
| Potassium titanate | 20 parts by weight |
| Zinc oxide | 20 parts by weight |

The resin composition had a flexural modulus of $7 \times 10^9$ Pa according to ASTM standard. The anisotropy, i.e., ratio of anisotropy in the direction in which the resin flew and that in the direction at a right angle thereto, was 1.1. Thus, it was confirmed that the resin composition had a considerably low anisotropy. A split optical alignment sleeve was fabricated from the resin composition thus obtained by injection molding in the same manner as in Embodiment 1 except that the temperatures of the nozzle and of the cylinder of the molding machine were decreased by 30° C.

Table 5 shows the sizes of the molded article thus obtained. The results indicate that the molded article obtained had dimensional accuracy as accurate as that obtained in Embodiment 1. Grabbing force and to holding force measured were 20 N and 4 N, respectively, thus meeting the requirement for optical connectors.

TABLE 5

Shape of Molded Article

| Item | Measured Value | Standard Deviation | Evaluation Method |
|---|---|---|---|
| Inner diameter | G: 2.454 mm | 2.9 μm | A |
| | AG: 2.451 mm | 2.2 μm | |
| Outer diameter | G: 3.638 mm | 3.3 μm | A |
| | AG: 3.641 mm | 3.7 μm | |
| Eccentricity | G: 2.9 μm | 1.1 μm | A |
| | AG: 4.1 μm | 2.0 μm | |
| Roundness error of inner diameter | G: 3.1 μm | 0.7 μm | A |
| | AG: 3.5 μm | 1.3 μm | |
| Roundness error of outer diameter | G: 4.2 μm | 1.8 μm | A |
| | AG: 4.4 μm | 2.5 μm | |
| Smoothness of inner surface (Ra) | 0.35 μm | — | B |

Figure 14:
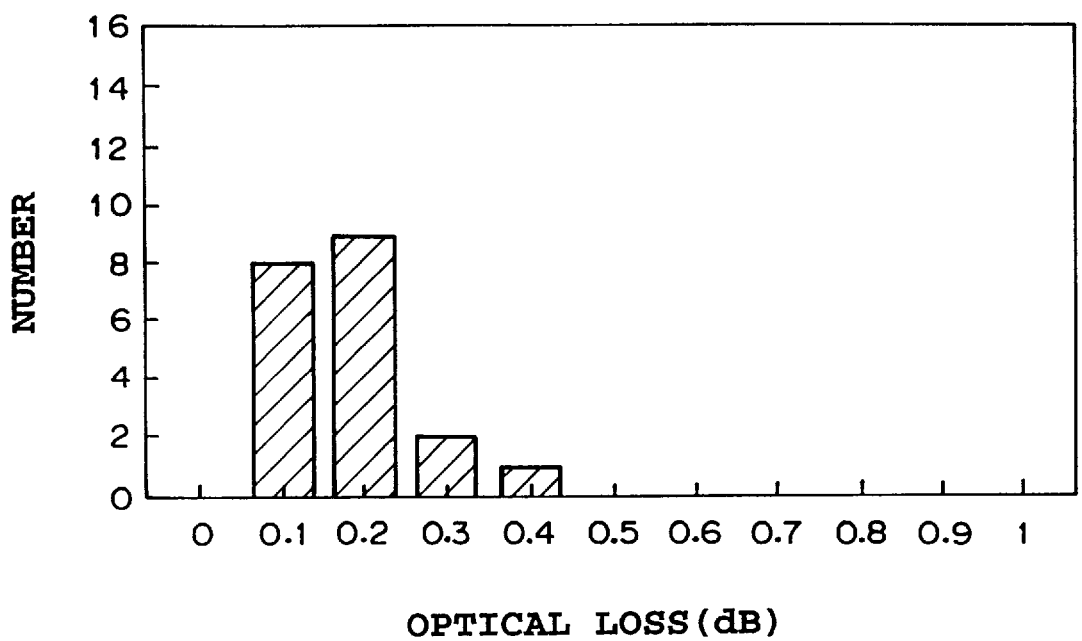
FIG. 14 is a graph illustrating distribution of connection loss of molded articles according to the present invention.
Figure 15:
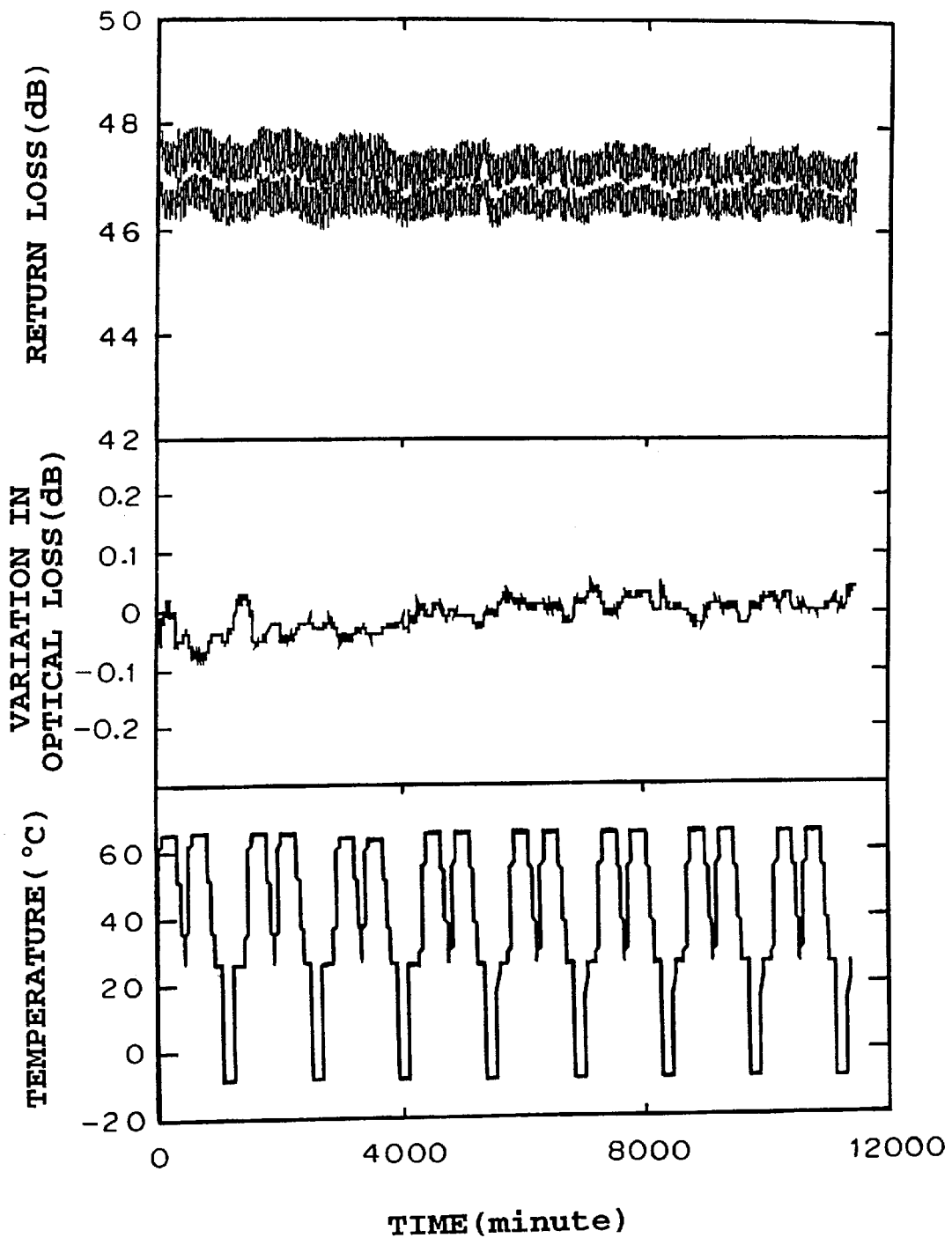
FIG. 15 is graph illustrating results of temperature cycle tests of a molded article according to one example of the present invention.

Notes:
G: gate side;
AG: anti-gate side
Number of test pieces: 20.
"A": Non-contact image processing measurement system
"B": Feeler surface roughness meter FIG. 14 shows distribution of coupling characteristics, which indicates that satisfactory characteristics were obtained as in Embodiment 1. Results of various tests on reliability showed no problem as in Embodiment 1. FIG. 15 illustrates results of temperature cycle tests on return loss and optical loss on coupling. No variation in coupling characteristics was observed as in Embodiment 1.

EMBODIMENT 3

A resin composition having the following formulation was prepared.

| | |
|---|---|
| Cresol novolak epoxy resin | 100 parts by weight |
| Phenol novolak curing agent | 100 parts by weight |
| Silica powder (average particle diameter: 10 μm) | 500 parts by weight |

The resin composition had a flexural modulus of $1.8 \times 10^{10}$ Pa according to ASTM standard. The anisotropy, i.e., ratio of anisotropy in the direction in which the resin flew and that in the direction at a right angle thereto, was 1.0. Thus, it was confirmed that the resin composition had a considerably low anisotropy. A split optical alignment sleeve was fabricated from the resin composition thus obtained by injection molding in the same manner as in Embodiment 1 except for using a mold having the shape shown in Table 6 below.

TABLE 6

Shape of Mold

| | |
|---|---|
| Outer diameter of core pin | 2.484 mm |
| Inner diameter of cavity | 4.015 mm |
| Width of slit | 0.5 mm |
| Length | 11.4 mm |
| Gate | 4-pin gate |
| Difference in outer diameter of core pin between gate side and anti-gate side | 0.2 μm |
| Difference in inner diameter of cavity between gate side and anti-gate side | 0.3 μm |
| Cylindricality of cavity | 0.6 μm |
| Cylindricality of core pin | 0.3 μm |
| Eccentricity of core pin and cavity on the gate side | 1.8 μm |
| Eccentricity of core pin and cavity on the anti-gate side | 1.9 μm |

Table 7 shows the conditions of injection molding. Table 8 shows the sizes of the molded article.

TABLE 7

Conditions of Injection

| Item | Condition |
|---|---|
| Drying of resin | Room temperature Dry atmosphere |
| Cylinder temperature | |
| Rear portion | 35° C. |
| Medium portion | 50° C. |
| Nozzle portion | 86° C. |
| Mold temperature | 180° C. |
| Injection pressure | $4 \times 10^7$ Pa |
| Screw back-pressure | $8 \times 10^6$ Pa |
| Dwelling pressure | $5 \times 10^7$ Pa |
| Injection time | 20 seconds |
| Screw revolution number | 70 rpm |
| Cycle time | 60 seconds |

TABLE 8

Shape of Molded Article

| Item | Measured Value | Standard Deviation | Evaluation Method |
|---|---|---|---|
| Inner diameter | G: 2.486 mm | 1.0 μm | A |
| | AG: 2.486 mm | 1.0 μm | |
| Outer diameter | G: 4.006 mm | 3.0 μm | A |
| | AG: 4.005 mm | 3.0 μm | |
| Eccentricity | G: 2.1 μm | 1.5 μm | A |
| | AG: 4.3 μm | 1.3 μm | |
| Roundness error of inner diameter | G: 4.1 μm | 1.8 μm | A |
| | AG: 3.7 μm | 0.9 μm | |

TABLE 8-continued

Shape of Molded Article

| Item | Measured Value | Standard Deviation | Evaluation Method |
|---|---|---|---|
| Roundness error of outer diameter | G: 4.4 μm<br>AG: 4.6 μm | 2.2 μm<br>2.9 μm | A |
| Smoothness of inner surface (Ra) | 0.05 μm | — | B |

Figure 16:
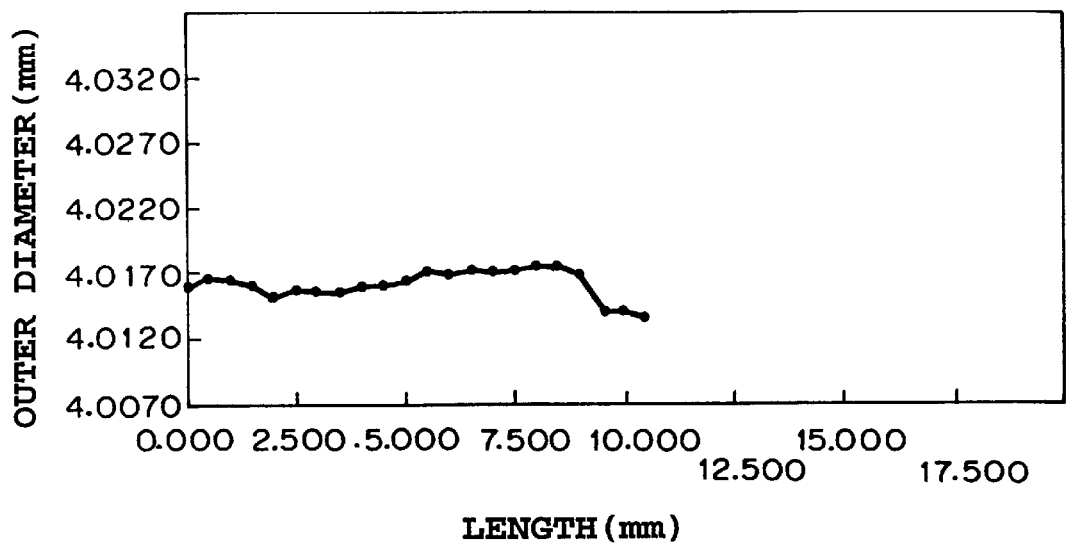
FIG. 16 is a graph illustrating a variation along length of outer diameter of a molded article according to one example of the present invention.

Notes:
G: gate side;
AG: anti-gate side
Number of test pieces: 20.
"A": Non-contact image processing measurement system
"B": Feeler surface roughness meter A molded article obtained according to this embodiment had good dimensional accuracy as described above. FIG. 16 shows the results of measurement of the outer diameter of the molded article. From the results, it can be seen that the value of outer diameter was constant in the longitudinal direction and flat particularly in the central region of the molded article.

Figure 17:
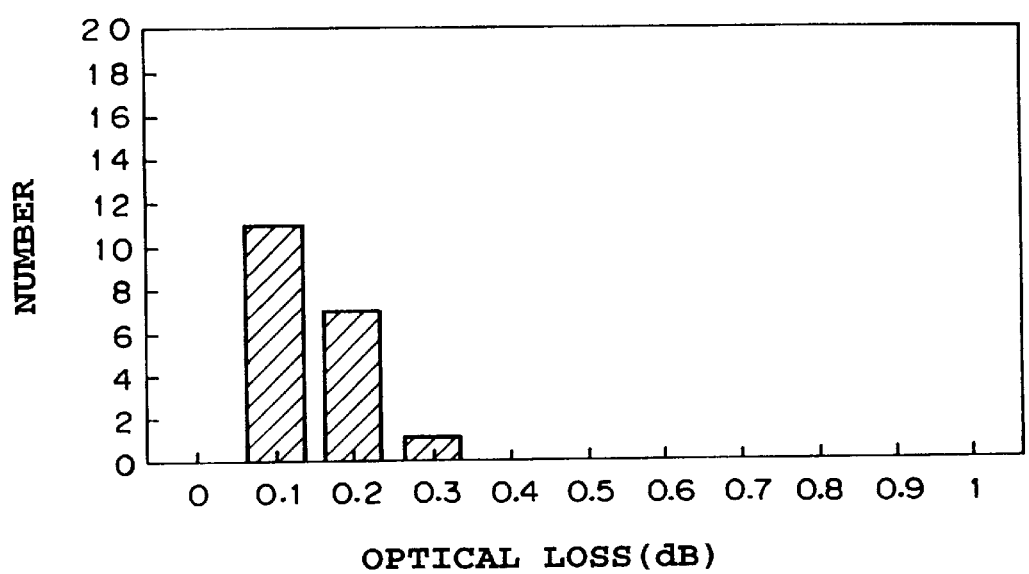
FIG. 17 is a graph illustrating distribution of connection loss of molded articles according to the present invention.
Figure 18:
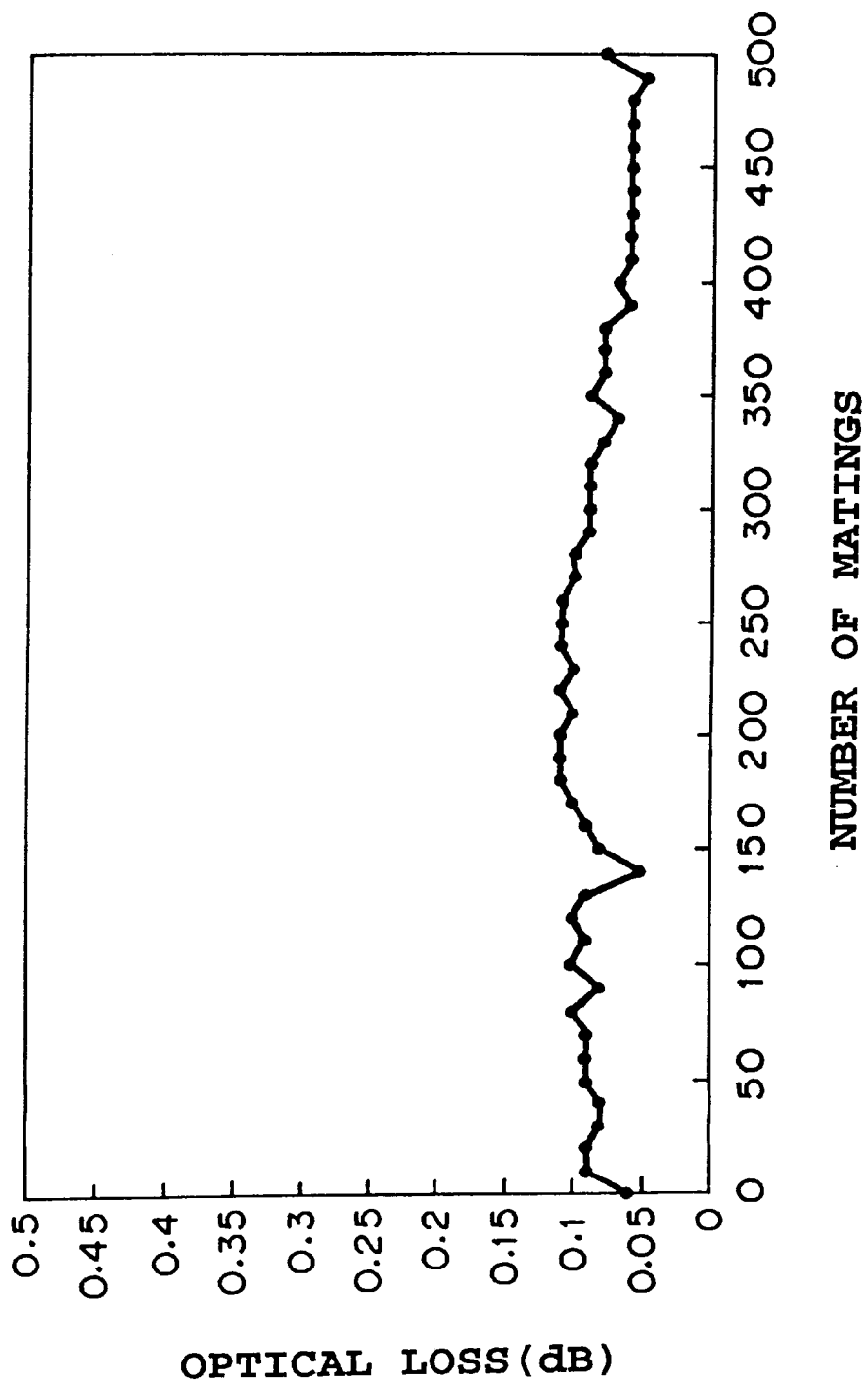
FIG. 18 is illustrating avariation of optical loss in push-pull repetition testing for a molded article according to an example of the present invention.
Figure 19:
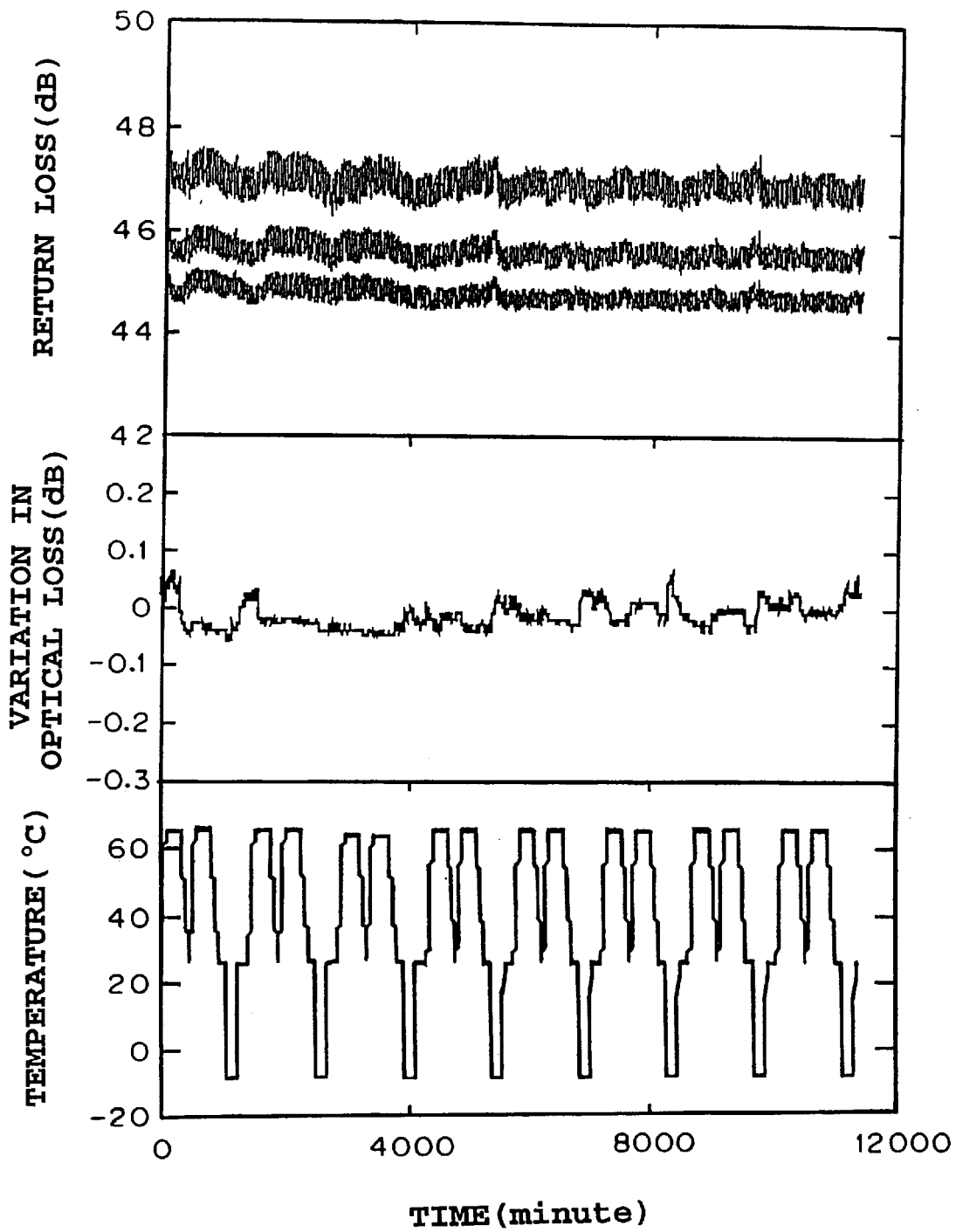
FIG. 19 is a graph illustrating results of temperature cycle tests of a molded article according to one example of the present invention.

Grabbing force and holding force measured were 20 N and 4 N, respectively, thus meeting the requirement for optical connectors. Here, zirconia ferrule was used for coupling or mating tests of single-mode optical fibers. End surfaces of optical fibers were ground under PC conditions. The results obtained are shown in Table 9 and FIGS. 17 and 18. FIG. 19 illustrates results of temperature cycle tests on return loss and optical loss upon coupling of the molded article. In this case, the end faces of the optical fibers were ground under Ad-PC grinding conditions. As in embodiment 1, no variation in coupling characteristics was observed.

TABLE 9

| Item | Test Condition | Target Property | Test Results |
|---|---|---|---|
| Optical Characteristics | | | |
| Coupling loss | λ = 1.3 μm | 0.5 dB or less | av. 0.10 dB |
| Return loss | λ = 1.3 μm | 25 dB or more | 28 dB |
| Mechanical characteristics | | | |
| Attachment/detachment test | 500 times | Return loss: 25 dB or more | 28 ± 1 dB |
| Vibration test | 10–55 Hz, 2 hr | Return loss: 25 dB or more | 27 ± 1 dB |
| Impact test | 100G, 6 mm | Return loss: 25 dB or more | 26 ± 1 dB |

TABLE 9-continued

| Item | Test Condition | Target Property | Test Results |
|---|---|---|---|
| Accelerated deterioration characteristics | | | |
| Temperature cycle | −25 to 70° C., 100 cycles | Return loss: 25 dB or more | 26 dB |
| High temperature | 85° C., 960 hr | Return loss: 25 dB or more | 26 dB |
| Temperature-humidity cycle | −10 to 65° C., 93% RH | Return loss: 25 dB or more | 26 dB |

As shown above, the plastic split alignment sleeves of the present invention have sufficient characteristics for coupling single-mode optical fibers.

EMBODIMENTS 4–11

Plastic alignment sleeves were fabricated in the same manner as in Embodiment 3 except that the resin compositions having respective formulations shown in Table 10 below were used. As in Embodiment 3, each of the plastic alignment sleeves had excellent characteristics as shown in Table 10.

TABLE 10

| Embodiment | Resin | Additive | Anisotropy | Flexural Modulus ($10^7$ Pa) |
|---|---|---|---|---|
| 4 | PEI | Silica powder 20% | 1.4 | 520 |
| 5 | PES | Silica powder 30% | 1.4 | 600 |
| 6 | Epoxy resin | Potassium titanate 60% | 1.1 | 1,050 |
| 7 | Epoxy resin | Zinc oxide 70% | 1.1 | 1,100 |
| 8 | PEI | Potassium titanate 20% | 1.3 | 530 |
| 9 | PEI | Mica 30%<br>Glass fiber 10% | 1.5 | 850 |
| 10 | PEI | Potassium titanate 30%<br>Glass fiber 10% | 1.5 | 950 |
| 11 | Epoxy resin | Silica powder 50%<br>Potassium titanate 10% | 1.1 | 1,050 |

COMPARATIVE EMBODIMENTS 1–10

Plastic split alignment sleeves having compositions outside the scope of the present invention as shown in Table 11 below were fabricated, and various characteristics were measured. Table 11 also shows these results. It can be seen from the results that the plastic split alignment sleeves of comparative embodiments were inferior to the split alignment sleeves of the present invention in mechanical strength, molding failure, attachment/detachment tests and accelerated deterioration tests.

TABLE 11

| Comparative Embodiment | Resin | Additive | | Anisotropy | Flexural Modulus ($10^7$ Pa) | Characteristics | Result |
|---|---|---|---|---|---|---|---|
| 1 | PES | Carbon fiber | 20% | 1.6 | 1200 | Coupling loss | av. 0.7 dB |
| 2 | PEI | Carbon fiber | 30% | 1.6 | 1500 | Coupling loss | av. 0.6 dB |
| 3 | PC | Potassium titanate<br>Glass fiber | 60%<br>20% | 1.6 | 480 | Holding force | 130 g |
| 4 | PAR | Zinc oxide<br>Glass fiber | 20%<br>10% | 1.6 | 470 | Holding force | 120 g |
| 5 | PC | Potassium titanate<br>Glass fiber | 20%<br>10% | 1.7 | 650 | Temp. & Hum. cycle | Optical loss 0.3 −> 1.2 dB |

TABLE 11-continued

| Comparative Embodiment | Resin | Additive | | Anisotropy | Flexural Modulus ($10^7$ Pa) | Characteristics | Result |
|---|---|---|---|---|---|---|---|
| 6 | PAI | Zinc oxide | 40% | 1.6 | 550 | Temp. & Hum. cycle | Optical loss 0.4 -> 1.8 dB |
| | | Glass fiber | 20% | | | | |
| 7 | PSF | Potassium titanate | 35% | 1.6 | 600 | Temp. & Hum. cycle | Optical loss 0.3 -> 0.6 dB |
| | | Glass fiber | 20% | | | | |
| 8 | PAR | Zinc oxide | 30% | 1.6 | 580 | Temp. & Hum. cycle | Optical loss 0.3 -> 0.8 dB |
| | | Glass fiber | 20% | | | | |
| 9 | PPS | Potassium titanate | 35% | 2.5 | 1300 | Coupling loss | av. 2.3 dB |
| 10 | LCP | Zinc oxide | 30% | 2.0 | 1000 | Coupling loss | av. 1.5 dB |

Notes:
"av." stands for "average";
"Temp. & Hum." stands for "Temperature and Humidity".

COMPARATIVE EMBODIMENT 11

A plastic split alignment sleeve was fabricated in the same manner as in Embodiment 1 except that a conventional slide-core type mold was used instead of the mold used in Embodiment 1. The molded article had an eccentricity of 10.3 μm on the gate side and 12.5 μm on the anti-gate side, thus showing a considerable decrease in eccentricity. Average optical loss on coupling was 1.2 dB, indicating that the split alignment sleeve is unsuitable for coupling single-mode optical fibers.

COMPARATIVE EMBODIMENTS 12–15

Plastic split alignment sleeves were fabricated with insufficient precision of processing parts of mold and of assembly. Table 12 shows the results obtained. From the results, it can be seen that a decrease in dimensional accuracy of a mold results in a decrease in the dimensional accuracy of molded articles, particularly a decrease in coupling characteristics of the molded article.

TABLE 12

Characteristics of Mold and Split Sleeve Used in Comparative Embodiments

| Comparative Embodiment | Characteristics of Mold | Characteristics of Molded Article |
|---|---|---|
| 12 | G/AG difference* of core pin: 2.1 μm | Coupling loss: av. 0.5 dB Push-pull repetition 200 times: 0.8 dB |
| 13 | Cylindricality of core pin: 1.3 μm | Coupling loss: av. 0.8 dB |
| 14 | Cylindricality of cavity: 2.1 μm | Coupling loss: av. 0.7 dB |
| 15 | Eccentricity G: 3.5 μm AG: 4.6 μm | Coupling loss: av. 0.7 dB |

Notes:
"G/AG difference" stands for a difference between the gate side and the anti-gate side.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A plastic split optical alignment sleeve comprising a cylindrical plastic sleeve with a slit in a side surface thereof to be arranged in an adapter which splices optical fiber chords having inserted therethrough optical fibers and having a ferrule on each end thereof, said sleeve being capable of engaging therein said ferrules on both sides thereof to splice said optical fibers, wherein said split alignment sleeve comprises a resin composition which when injection molded exhibits an anisotropy of 1.5 or less, the anisotropy being expressed in terms of a ratio of a physical property in a first direction in which a resin in said resin composition flew upon injection molding and that in a second direction which is at a right angle to the first direction, further wherein said resin composition comprises at least one resin selected from the group consisting of polyetherimides, polyethersulfones, and epoxy resins and at least one inorganic substance selected from the group consisting of whiskers and silica powder.

2. The plastic split optical alignment sleeve as claimed in claim 1, wherein said physical property is flexural module.

3. The plastic split optical alignment sleeve as claimed in claim 1, wherein said resin in said resin composition comprises at least one resin selected from the group consisting of polyetherimides and polyethersulfones and said inorganic substance is at least one of said whiskers.

4. The plastic split optical alignment sleeve as claimed in claim 3, wherein said resin composition has a flexural modulus of $5 \times 10^9$ Pa or more.

5. The plastic split optical alignment sleeve as claimed in claim 3, wherein said resin composition contains said whisker in an amount of 20 to 60% by weight.

6. The plastic split optical alignment sleeve as claimed in claim 1, wherein said resin composition comprises an epoxy resin and silica powder.

7. The plastic split optical alignment sleeve as claimed in claim 6, wherein said resin composition has a flexural modulus of $10^{10}$ Pa or more.

8. The plastic split optical alignment sleeve as claimed in claim 6, wherein said resin composition contains said silica powder in an amount of 50 to 90% by weight.

9. A method of fabricating a plastic split optical alignment sleeve comprising a cylindrical plastic sleeve with a slit in a side surface thereof to be arranged in an adaptor which splices optical fiber chords each having inserted therethrough an optical fiber and each having a ferrule on an end thereof, said sleeve being capable of engaging therein said ferrules on both sides thereof to splice said optical fibers, said method comprising the steps of:

providing a resin composition which when injection molded exhibits an anisotropy of 1.5 or less, the anisotropy being expressed in terms of ratio of a physical property in a first direction in which a resin in said resin composition flew upon injection molding and that in a second direction which is at right angles to the first direction; and injecting said resin composition using a mold comprising a cavity part which defines an outer diameter of a molded article, a splitting part which defines a splitting portion, and a core pin which defines an inner diameter of the molded article, said splitting part and said core pin constituting an integrated part.

10. The method as claimed in claim 9, wherein said physical property is flexural modulus.

11. The method as claimed in claim 9, wherein said resin composition comprises at least one resin selected from the group consisting of polyetherimides, polyethersulfones, and epoxy resins and at least one inorganic substance selected from the group consisting of whiskers and silica powder.

12. The method as claimed in claim 11, wherein said resin in said resin composition comprises at least one resin selected from the group consisting of polyetherimides and polyethersulfones and said inorganic substance is at least one of said whiskers.

13. The method as claimed in claim 11, wherein said resin composition comprises an epoxy resin and silica powder.

* * * * *